United States Patent [19]

Smith

[11] Patent Number: 5,545,965
[45] Date of Patent: Aug. 13, 1996

[54] THREE PHASE MOTOR OPERATED FROM A SINGLE PHASE POWER SUPPLY AND PHASE CONVERTER

[76] Inventor: Otto J. M. Smith, 612 Euclid Ave., Berkeley, Calif. 94708-1332

[21] Appl. No.: 279,597

[22] Filed: Jul. 25, 1994

[51] Int. Cl.⁶ .................................................. H02P 7/00
[52] U.S. Cl. ................................................. 318/768
[58] Field of Search .................................. 318/768, 769, 318/772–777, 781, 800

[56] References Cited

U.S. PATENT DOCUMENTS

| | | | |
|---|---|---|---|
| 620,988 | 3/1899 | Steinmetz et al. | 318/768 |
| 1,951,026 | 3/1934 | Levine | 318/749 |
| 1,973,010 | 9/1934 | Morrison | 318/768 |
| 2,423,348 | 7/1947 | Short | 318/768 |
| 2,832,925 | 4/1958 | Koll et al. | 318/768 |
| 3,202,896 | 8/1965 | Lewus | 318/768 |
| 3,721,646 | 9/1966 | Lewus | 318/781 |
| 3,809,980 | 5/1974 | Nottingham, Jr. | 318/768 |
| 5,300,870 | 4/1994 | Smith | 318/749 X |

*Primary Examiner*—Jonathan Wysocki
*Attorney, Agent, or Firm*—Flehr, Hohbach, Test, Albritton & Herbert

[57] ABSTRACT

A standard three-phase induction motor wherein two motor windings are connected across a single phase power supply, and a center-tapped autotransformer is connected between the third motor winding and one of the other motor terminals. A capacitor provides an injected current of a suitable phase angle for the third motor winding by being connected between the center tap and the second one of the other motor terminals. This same concept can also be used for a rotary-phase converter to generate three-phase voltage from a single phase line. The three-phase voltage can be used to supply several three-phase motors.

26 Claims, 24 Drawing Sheets

5,545,965

THREE PHASE MOTOR OPERATED FROM A SINGLE PHASE POWER SUPPLY AND PHASE CONVERTER

BACKGROUND OF THE INVENTION

This present invention is directed to a 3-winding induction motor which is operated from a-single-phase alternating-current power supply.

Three-phase induction motors have higher efficiency than single-phase induction motors of similar quality. Only single-phase power is available in many locations, however. Methods of operating three-winding motors from a single-phase power supply are taught in U.S. Pat. No. 4,792,740, entitled "Three-Phase Induction Motor With Single-Phase Power Supply", issued Dec. 20, 1988 to Otto J. M. Smith, and in U.S. Pat. No. 5,300,870, entitled "Three-Phase Motor Control", issued Apr. 5, 1994 to Otto J. M. Smith. This present invention is directed to an improved system using a transformer.

OBJECTS AND SUMMARY OF THE INVENTION

It is a general object of the present invention to provide a three-phase induction motor which operates efficiently on a single-phase power supply.

It is another object of this invention to provide a transformer and capacitor circuit to excite a three-phase induction motor from a single-phase supply.

It is another object of this invention to provide an improved method of sensing the motor state.

It is another object of this invention to provide an improved rotary phase converter.

It is another object of this invention to provide a transformer-augmented rotary phase converter.

It is another object of this invention to provide a method of sensing the motor state for control of a phase converter.

In accordance with the above objects, there is provided a 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, a capacitor connected between a second terminal of said transformer and said first supply line, and a connection of a third terminal of said transformer to a third terminal of said motor.

BRIEF DESCRIPTION OF THE DRAWINGS

FIG. 18 is an augmented 2-capacitor phase control circuit using both the capacitor C1 of. FIG. 12 and the capacitor C2 with the voltage-boost autotransformer of FIG. 13.

DESCRIPTION OF PREFERRED EMBODIMENTS

Figure 1:
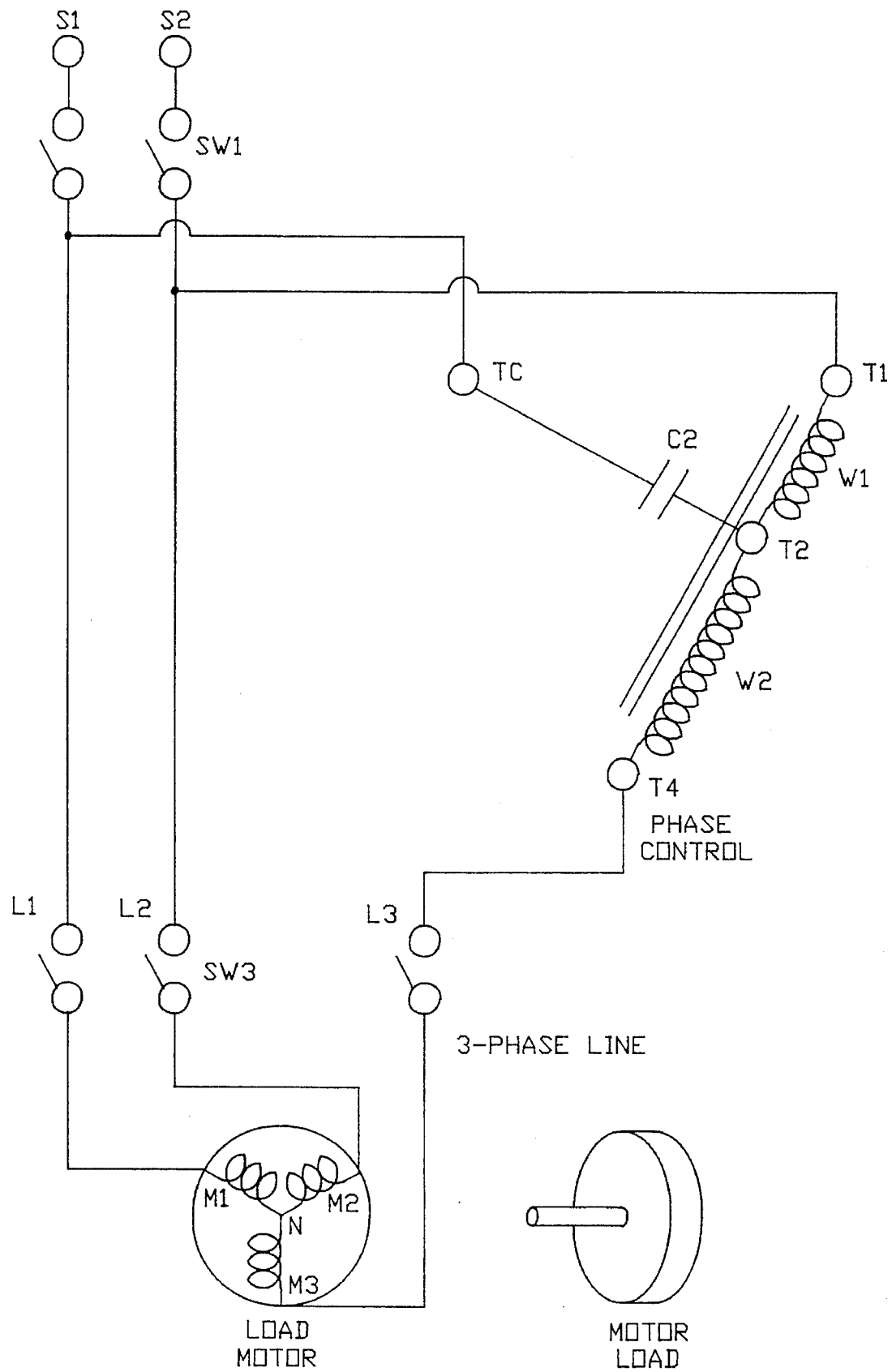
FIG. 1 is a 3-winding induction motor supplied from a single-phase power supply with a phase control consisting of a capacitor connected to a tap on an autotransformer.

In FIG. 1, S1 and S2 are the terminals of a single-phase power supply. M1, M2, and M3 are the three terminals of a 3-winding wye-connected a-c induction motor. The center-tap or neutral is N in the wye connection of the three windings. (The motor can be a conventional three-phase motor with the windings symmetrically placed geometrically inside of the stator, which conventionally are excited by a balanced three-phase power supply connected to M1, M2, and M3.)

The three motor terminals M1, M2, and M3 are connected by switch SW3 to lines designated L1, L2, and L3, respectively. L1 and L2 are connected to S1 and S2 by switch SW1.

SINGLE-CAPACITOR AND AUTOTRANSFORMER

One embodiment of this invention is a phase control unit which is the tapped autotransformer with terminals T1 and T4 and tap T2. Capacitor C2 is connected between T2 and TC, which is connected to L1.

The transformer winding between T1 and T2 is designated W1, with turns NW1. The transformer winding between T2 and T4 is designated W2, with turns NW2. The step-up turns ratio N will be defined as:

$$N=(NW1+NW2)/(NW1) \quad (1)$$

The step-down turns ratio R will be defined as:

$$R=(NW1)/(NW1+NW2)=1/N \quad (2)$$

With switch SW3 closed, when switch SW1 is also closed, the motor will run at a speed slightly less than a synchronous speed, depending on the number of poles and the frequency of the single-phase power supply. The phasor voltage from TC to T1 is the reference voltage V at an angle of zero degrees and the S1, S2 supply voltage. The voltage between M1 and M2 is the same as the supply voltage, V, between S1 and S2. Capacitor C2 is chosen so that at a preselected full shaft load the magnitude of the voltage between M2 and M3 across the transformer from T1 to T4 is approximately equal to |V|. The phase sequence is M1, M2, M3, and the motor receives approximately balanced 3-phase voltage.

A capacitor current IC2 flows through C2, which current leads in phase, by definition, the voltage from TC to T2 by 90 degrees. This current divides, with a part IW1 flowing in transformer winding W1, and the remainder IW2 flowing in transformer winding W2.

The ampere-turns in the two windings are approximately equal.

$$(IW1)(NW1)=(IW2)(NW2). \quad (3)$$

$$(IW1+IW2)=IC2. \quad (4)$$

$$(IW2)=(IC2)(NW1)/(NW1+NW2)=(IC2)(R)=IC2/(N) \quad (5)$$

The preselected full-load current to be driven into terminal M3 is therefore (IC2)(R).

The voltage across winding W1 is RV. The voltage VC2 across the capacitor C2 is V times the square root of $(1-R+R^2)$. The phase angle of the capacitor voltage from TC to T2 is a.

$$a=-\tan^{-1}((3^{0.5})(R)/(2-R)) \quad (6a)$$

Figure 3:
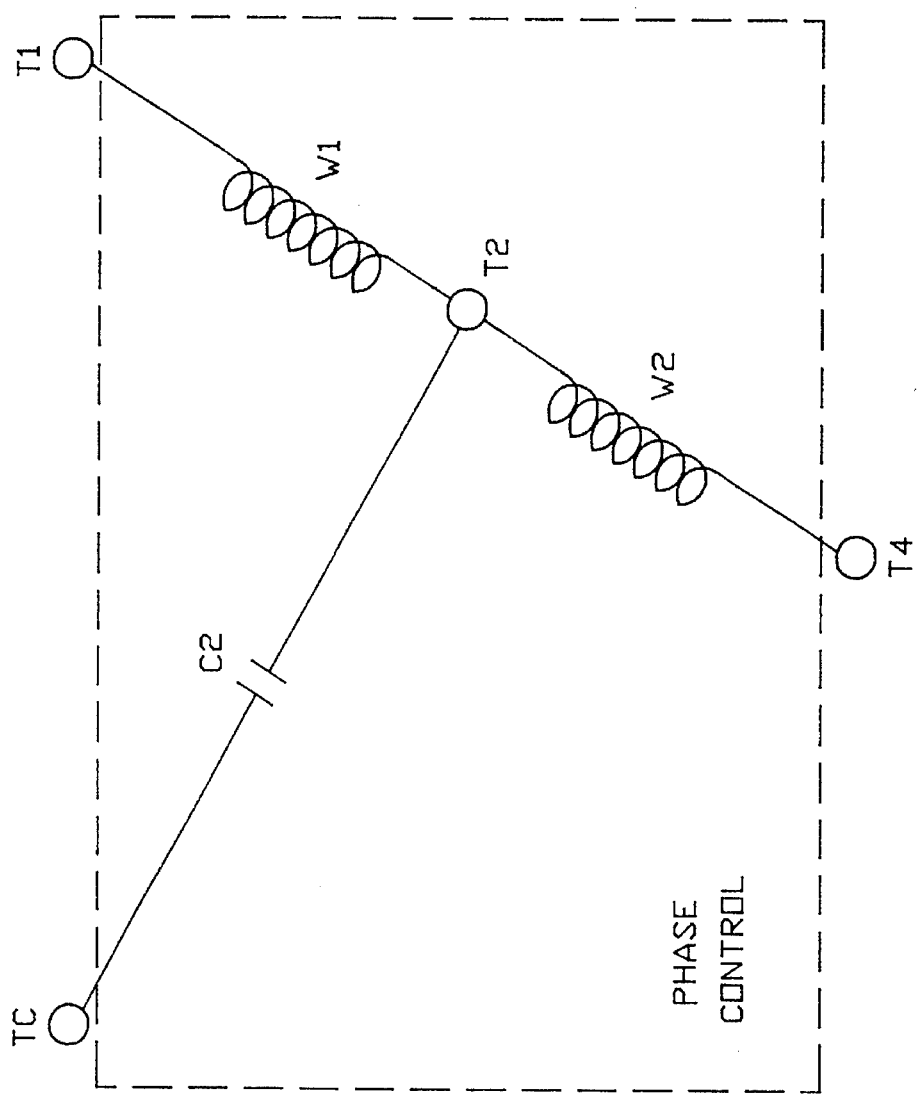
FIG. 3 is the phase control circuit used in FIG. 1.
Figure 22:
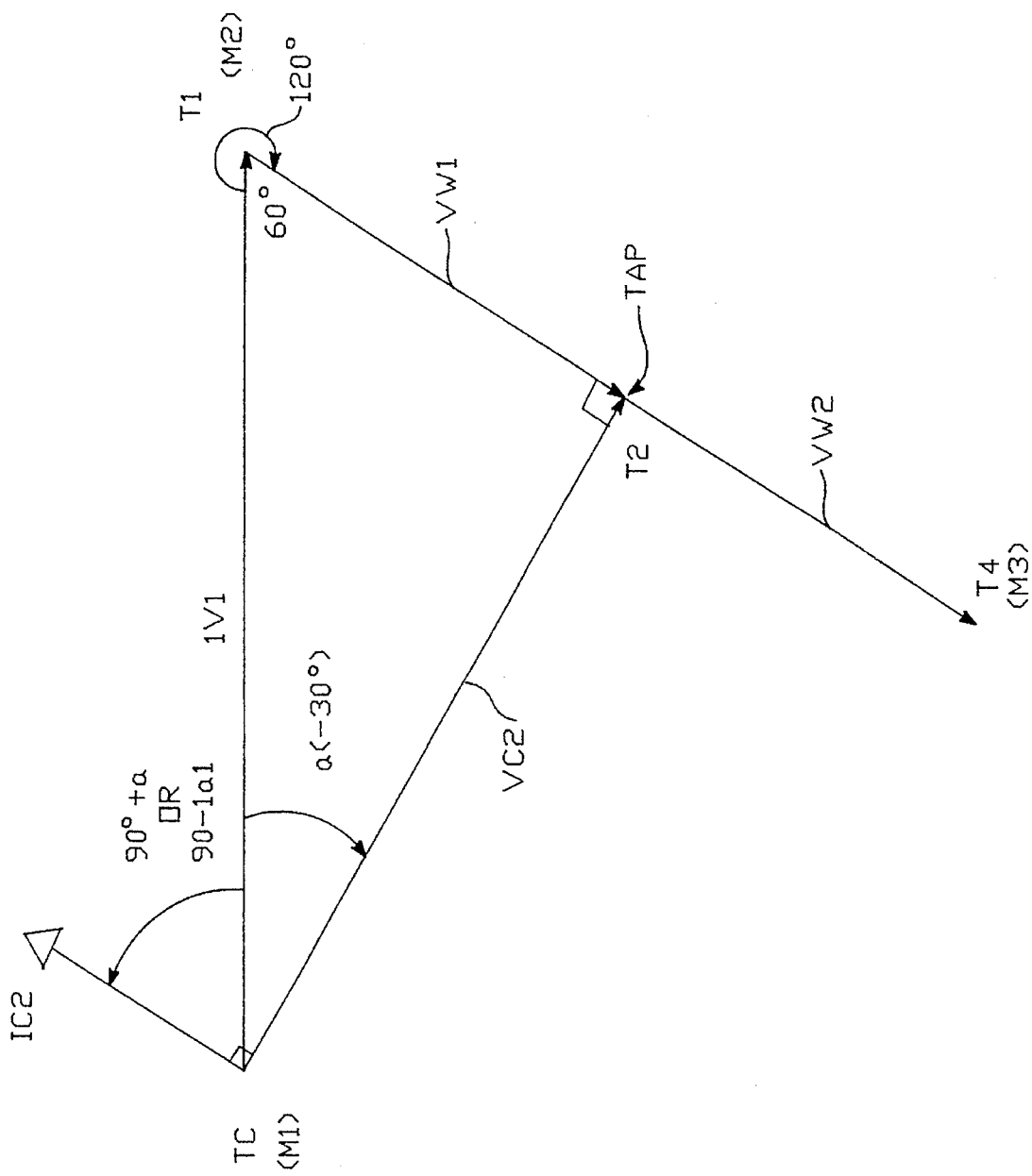
FIG. 22 is the voltage phasor diagram for FIGS. 1 and 3.

FIG. 22 is the voltage phasor diagram for FIGS. 1 and 3. The voltage from TC to T1 is the applied voltage of magnitude |V| and reference angle zero. The voltage from T1 to T2, called VW1, lags the reference by 120 degrees, and depending upon the location of the tap for T2, could be approximately V/2 in magnitude. The voltage from T2 to T4 also lags the reference by 120 degrees and is approximately (V-VW1) in magnitude, which could also be approximately V/2. The voltage from TC to T2 is the voltage across the capacitor C2, which in this phasor diagram equals 0.866 V, and lags the reference by an angle of −30 degrees. The phasor marked IC2 is the current through the capacitor C2, which leads the voltage by 90 degrees, so that the current phase angle is (90+a) degrees (but since "a" is negative this results in a 60° angle). The current from T2 to T1 in winding W1 has this same phase angle. The current from T2 to T4 in winding W2 also has this same phase angle.

When switch SW3 is closed, the motor voltages match this phasor diagram in FIG. 22.

$$V_{M1-M2}=V_{TC-T1} \quad (6b)$$

$$V_{M2-M3}=V_{T1-T4} \quad (6c)$$

Figure 23:
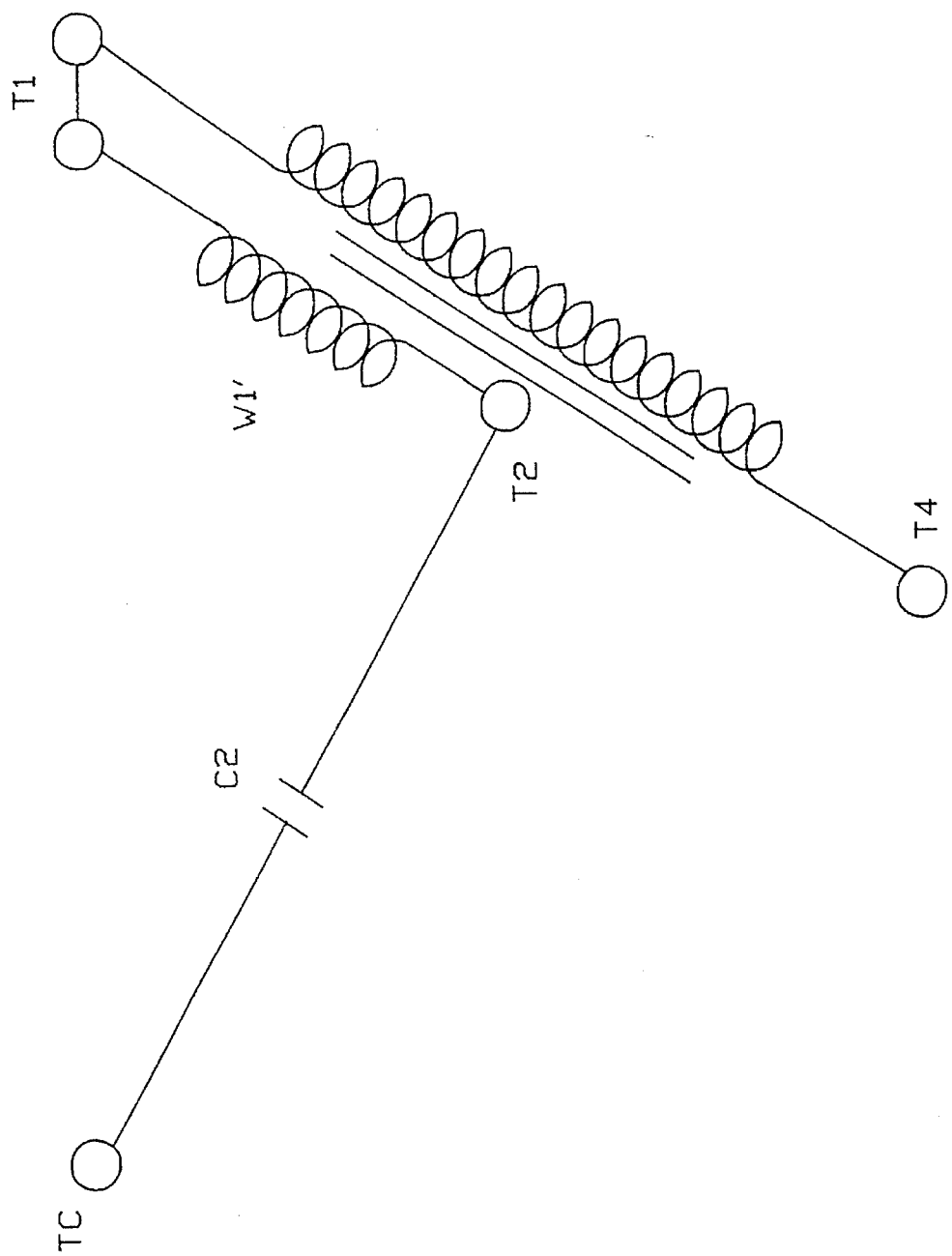
FIG. 23 is a 2-winding transformer for FIGS. 1 and 3.

It is also within the scope of this invention to use 2-winding or multiple-winding transformers in every case where an autotransformer is represented. FIG. 23 is a 2-winding transformer used in the circuits of FIGS. 1 and 3. The primary winding between T2 and T1 has the voltage -VW1 shown in the phasor diagram in FIG. 22. This winding also carries the current I=IC2 from T2 to T1. The secondary winding in FIG. 23 between T1 and T4 has the voltage of magnitude V and phase angle of 120 degrees lagging. The phasor voltage in this winding is also shown in FIG. 22. The step-up turns ratio N given in equation (1) also applies to this secondary winding. The current from T1 to T4 in this secondary is I/N, the same as in equation (5). Thus the two winding transformer has an effective center-tap or in general an intermediate tap as in an autotransformer.

Referring again to FIG. 22, the phase angle of the capacitor and winding currents is (a+90) degrees.

As an example, when T2 is a center-tap, R is one-half.

$$a=-30° \quad (7)$$

However this angle may be varied between −5° and −60° by location of the tap.

The magnitudes of the voltages are $$VW1=VW2=V/2. \quad (8)$$

$$VC2=0.866 \; V. \quad (9)$$

The angle of IW2 from T2 to T4 is 60 degrees. This drives winding M3-N, called the driven winding, DW, with a current which lags the winding voltage by 30 degrees, with a power-factor of 86.6%. This is suitable for a large motor with this good power-factor at full load. When the 3-winding motor is a three-phase motor with the three windings symmetrically spaced in the stator core, and designed to operate from balanced three-phase voltages with balanced three-phase currents, and a full-load power-factor of 86.6%, then when the driven winding has the above current, the other two windings will also have currents lagging their respective voltages by 30 degrees, so that all winding voltages and currents will be balanced. Half of the capacitor IC2 current goes into the driven winding of the motor, DW.

The motor in FIG. 1 will operate from single-phase at the high efficiency corresponding to the three-phase full-load efficiency.

When the rated motor current is I, the capacitor current is $$(IC2)=(N)(I) \quad (10)$$

A 10-ampere motor at 86.6% power-factor would have a capacitor current of 20 amperes and a capacitor voltage of 199.2 volts for a 230-volt supply. The capacitor would be 133.2 microfarads at 60 hertz. Its leading VARS (volt-ampere-reactive) would be 3983.8. Each transformer winding would be 1150 VA (volt-amperes).

It is within the scope of this invention for the three-winding motor to have physically unsymmetrical windings. Also the number of turns in the winding M3-N may be different than the number of turns in winding M1-N or winding M2-N. Also the machine may be an induction generator, and the transformer may be so connected with respect to the phase sequence that electrical power is delivered to the single-phase power system.

FIG. 1 is applicable for a small motor with a power-factor between 50% and 85%. In this case, the transformer tap is chosen so that the ratio N is between one and two, and the step down turns ratio R is between one-half and one.

A second example is a three-phase motor whose full-load power-factor is 70.7% and the phase angle of the current is lagging 45 degrees. The phase angle φ of the capacitor voltage is −45 degrees. The step-down turns ratio R is $$R = 2 \tan \phi/(\tan \phi - 3^{0.5}), \quad (11)$$

The turns ratio N is $$N = (\tan \phi - 3^{0.5})/(2 \tan \phi). \quad (12)$$

For this second example, $\tan \phi = -1$;

$$N = (3^{0.5} - 1)/2 = 0.73205, \quad (13)$$

and $$R = 1.36603 \quad (14)$$

$$N - 1 = 0.36603 = (NW2)/(NW2) \quad (15)$$

Winding W2 has 36.6% of the turns of winding W1. Winding W1 has R fraction of the total winding turns, 73.2%.

$$(NW2)/(NW1 + NW2) = (1 - R) \quad (16)$$

Winding W2 has (1-R) fraction of the total winding turns, 26.8%.

The capacitor current is N times the motor current, in this case, 136.6% of the motor current. When this motor has a full load current of 10 amperes at 230 volts, 60 hertz, the capacitor current is 13.66 amperes. The winding W2 current IW2 is 10 amperes, and the winding WI current IW1 is 3.66 amperes. The winding W2 voltage W2 is 61.63 volts. The winding W1 voltage VW1 is 168.4 volts. Each winding carries 616.3 volt-amperes.

The capacitor voltage is $$(VC2) = V(1 - R + R^2)^{0.5} = 206.2 \text{ volts}. \quad (17)$$

The capacitor VARS is 2816.8 var.

Any three-phase motor with a power-factor between 55% and 93% can be driven with the circuit of FIG. 1 with balanced currents at full load or a preselected load.

In summary, as disclosed above, the construction and operation of the present invention can be thought of as a sequence of constraints. And this is shown by the voltage phasor diagram of FIG. 22. Thus the first constraint is that of the three phase induction motor where rotation of the rotor interacts with its three windings to produce an M3 voltage phasor which is 120 degrees displaced from the single phase line voltage. Thus the terminal T4 on the autotransformer is constrained at this 120 angle which is illustrated in FIG. 22. Next the phase control unit which includes the autotransformer (or ordinary transformer connected like an autotransformer) and which includes iron core and inductive windings to thus provide a linking transformer action, has an induced voltage which reflects the constraint of the M3 winding. Lastly this induced voltage on the transformer winding is utilized by tapping the winding at a location to select a current phase angle by the use of a reactive component, the capacitor C2, which provides a current of phase angle suitable for injection into the same winding M3 of the induction motor. This is directly apparent from examination of FIG. 22 and the "TAP" location. It is necessary that all the above sequence of constraints be present for the present invention to effectively function.

I have provided a 3-winding induction motor with three electrical terminals, a single-phase power supply with two lines, and a transformer-with at least three electrical terminals, a first motor terminal connected to a first supply line, a second motor terminal connected to a second supply line, a first terminal of said transformer also connected to said second supply line, means to connect a capacitor between a second terminal of said transformer and said first supply line, and means to connect a third terminal of said transformer to a third terminal of said motor.

It is within the scope of this invention for the machine M1, M2, and M3 in FIG. 1 to be an induction generator, and for the torque on the shaft to be in such a direction that mechanical power is delivered into the machine from the shaft, and for the current in S1 and S2 to be in such a direction that electrical power is delivered from the rotating machine into the single-phase voltage system.

I have provided a rotating electrical machine with a rotating magnetic field, three electrical windings on the machine stator, said rotating field generating a first electrical potential on a first terminal of said windings, said field generating a second electrical potential on a second terminal of said windings, a transformer with a transformer winding receiving the potential difference between the said first potential and the said second potential, a capacitor connected between a third terminal of said three windings and an electrical tap on the said transformer winding, such that the current through the capacitor is injected into said transformer winding, and such that a portion of said capacitor current is injected from the said transformer into the said first terminal.

PRIOR ART

Figure 2:
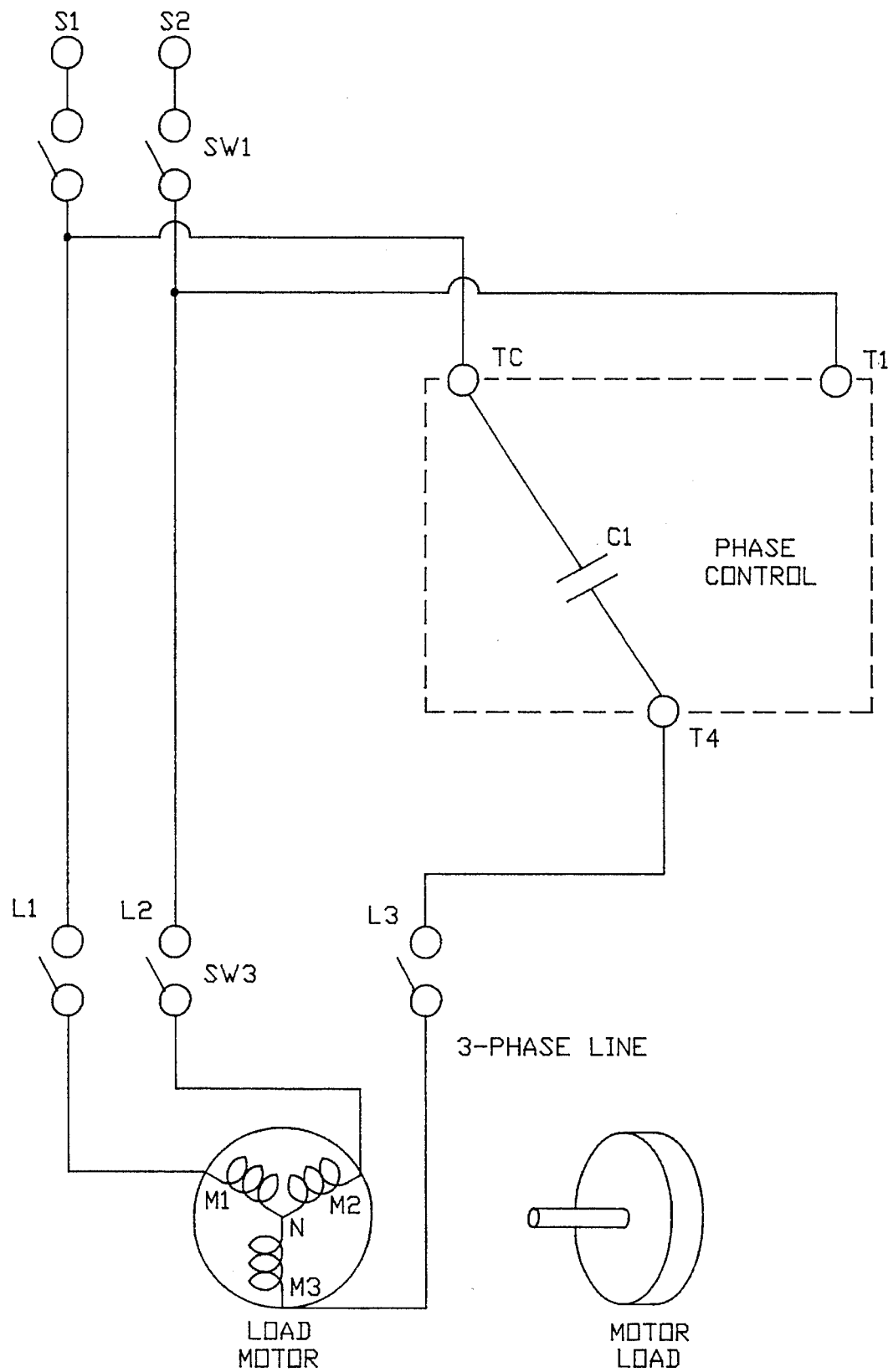
FIG. 2 is a 3-winding induction motor supplied from a single-phase supply with a phase control consisting of a capacitor connected between two of the motor terminals.

FIG. 2 is a prior art circuit in which a capacitor C1 is connected between terminals M1 and M3. There is no transformer. The single capacitor drives a current into winding M3-N which lags the voltage drop in the winding by approximately 60 degrees. This could be satisfactory for a very small motor with a 50% power-factor at full load. This has been used in the past on larger motors, but the winding currents were not balanced, and the motor was derated in power. The maximum permissible shaft torque was less than the motor rated torque. The motor efficiency on single-phase was less than the rated motor efficiency on three-phase voltage. The invention in FIG. 1 herein is superior to the prior art in FIG. 2, because the winding currents in FIG. 1 are balanced at a preselected load, and the single-phase efficiency at the said load is essentially equal to the three-phase efficiency at that load.

PHASE-CONTROL CIRCUIT

FIG. 3 is the phase control circuit of FIG. 1, consisting of a tapped autotransformer and a capacitor. The transformer is between terminals T1 and T4, with an intermediate tap at terminal T2. Capacitor C2 is connected between TC and T2. This capacitor drives a current into the tap, part of which exits at T4 into the driven winding DW.

TWO-CAPACITOR AND AUTOTRANSFORMER

Figure 4:
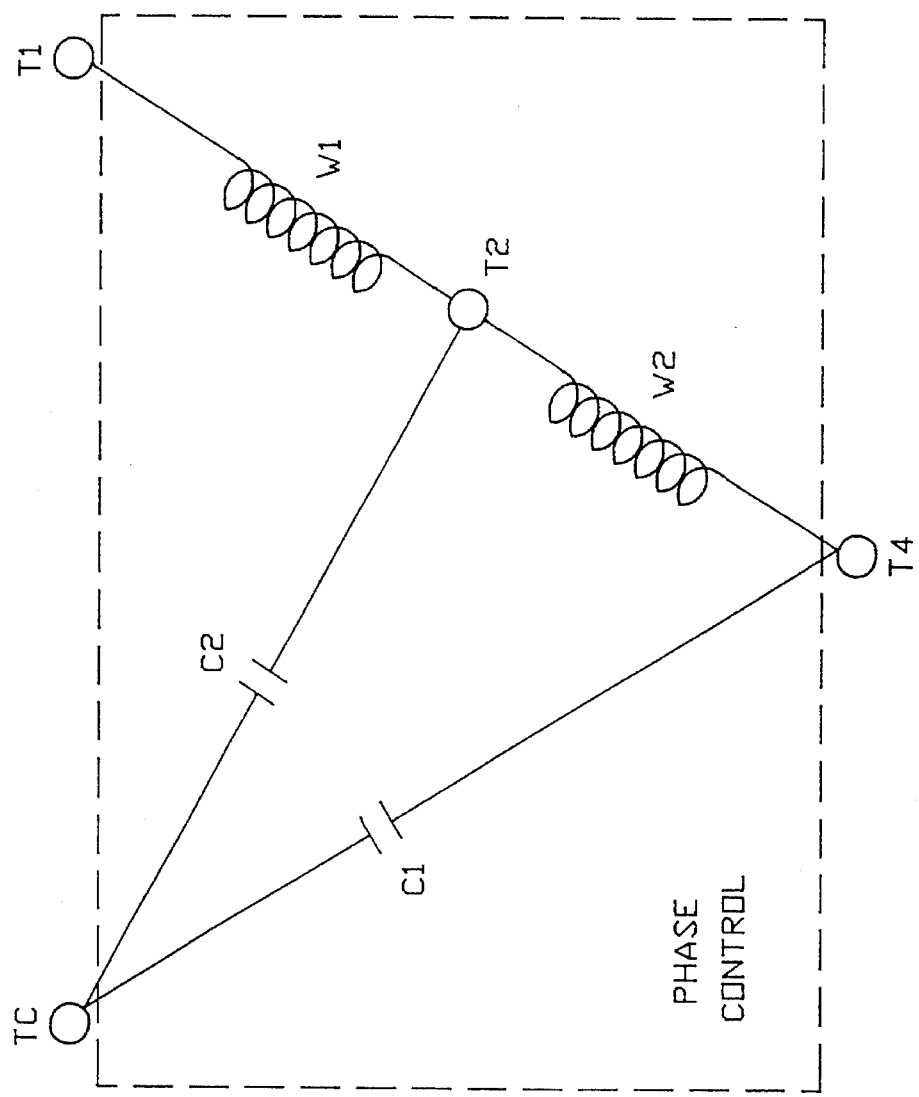
FIG. 4 is an augmented phase control circuit containing the elements of both the circuit in FIG. 2 and the circuit in FIG. 3.

FIG. 4 is an augmented phase control circuit for FIG. 1 consisting of the transformer-capacitor circuit in FIG. 1 and FIG. 3 plus the addition of the capacitor C1 from FIG. 2 between terminals TC and T4. Capacitor C1 can provide a component part of the current into the driven winding M3-N, and capacitor C2 can provide another component part of the current into winding M3-N. The transformer in FIG. 4 can be smaller and less expensive than the transformer in FIG. 1 because it requires less current capacity. The FIG. 4 circuit can also be used for motors with power-factors between 50% and 93%.

I have provided a 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, means to connect a capacitor between a second terminal of said transformer and said first supply line, means to connect a third terminal of said transformer to a third terminal of said motor and means to connect a second capacitor between said first supply line and said third terminal of said motor.

Figure 5:
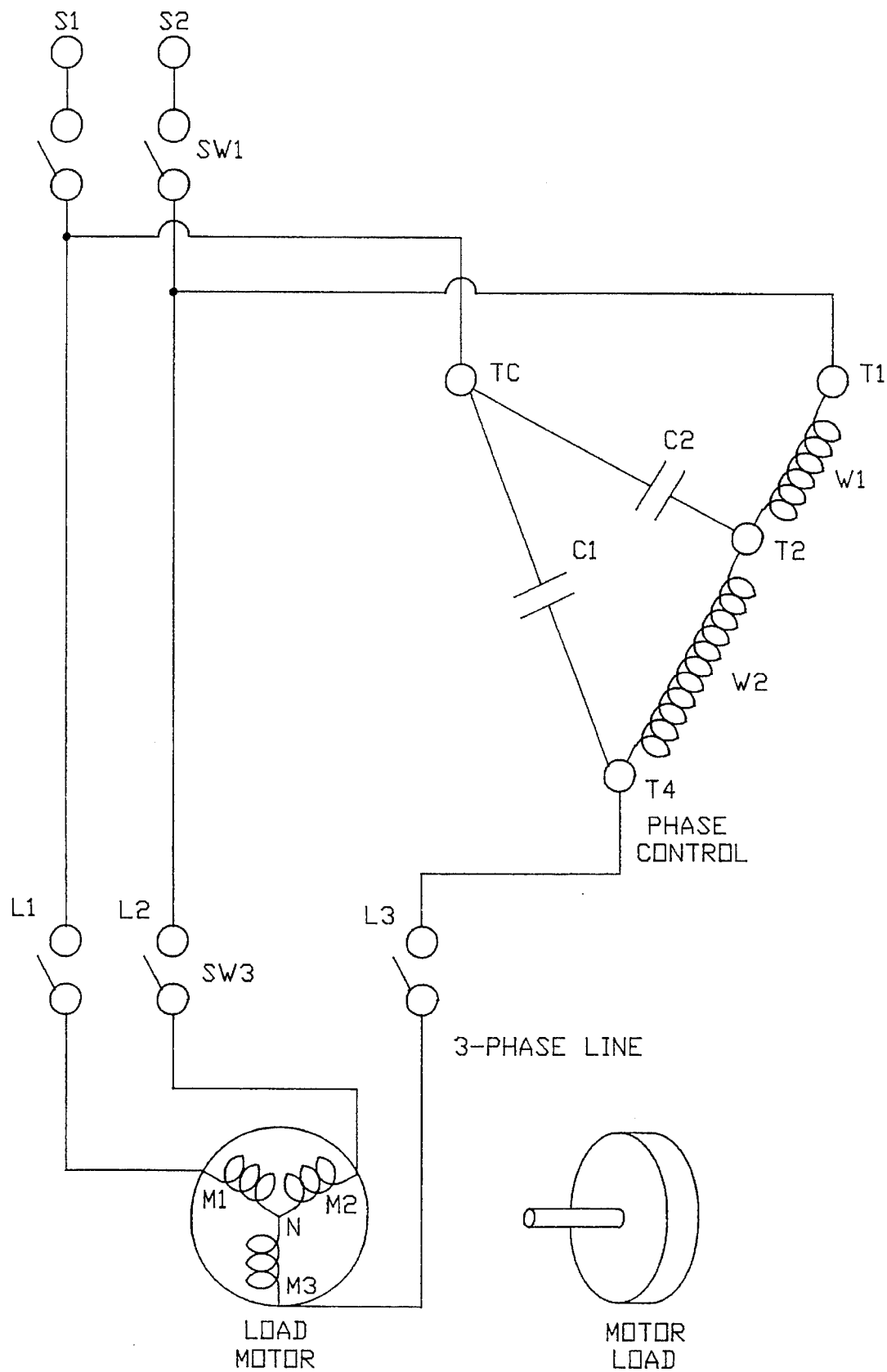
FIG. 5 is a 3-winding induction motor supplied from a single-phase supply with the phase control circuit of FIG. 4.

FIG. 5 is the three-winding induction motor supplied from a single-phase supply with the phase control circuit of FIG. 4.

CENTER-TAPPED AUTOTRANSFORMER

A convenient design for many motors is to select a center-tapped autotransformer to use in FIGS. 4 and 5. One extreme of the use of the circuit in FIG. 5 is for a motor with 86.6% power-factor. C1 is zero. This is the same as the first example above in FIG. 1. Another extreme of the use of the circuit in FIG. 5 is for a motor with 50% power-factor. In this case, C2 is zero, there is no transformer, and C1 supplies all of the injected current into the driven winding DW.

With a center-tapped autotransformer, R is one-half, and the current component (R) (IC2) lags the winding voltage by 30 degrees. The current component (IC1) lags the winding voltage by 60 degrees. The phasor sum of these two current components should be the total winding current I lagging the winding voltage by the angle $\phi$, where I and $\phi$ correspond to the desired balanced motor conditions at a preselected load, for example, full load. As phasors, $$I(\cos \phi + j\sin \phi) = (IC1) + (IC2)/2. \tag{18}$$

For magnitudes only, $$|IC1| = 2I \sin (\phi - 30) \tag{19}$$

$$|IC2| = 4I \sin (60 - \phi) \tag{20}$$

The motor in the second example above had 10 amperes at $\phi$ of 45 degrees. For this second example, $|IC1|=5.176$ amperes, and $|IC2|=10.353$ amperes. VC1 is 230 volts. VC2 is 199.2 volts. The reactive vars for C1 are 1190.6 and for C2 are 2062.2. The sum of both is 3252.75 vars. The motor windings lagging vars are 2816.9. The net single-phase line vars are 435.84 leading. The single-phase line power-factor is 98.8%. The phase angle of the line current is leading 8.8 degrees. This is neglecting the magnetizing current of the transformer.

Each transformer winding carries 5.18 amperes at 115 volts, or 595.3 VA. A comparison of the FIG. 5 circuit with the FIG. 1 circuit for the same motor shows that the FIG. 5 transformer is slightly smaller than the FIG. 1 transformer. The FIG. 5 capacitive vars is approximately 15% larger than the FIG. 1 capacitive vars. An advantage of FIG. 5 is that there are readily available and inexpensive transformers which have rational or integer turns ratios. This is not a serious constraint because it is easy to select the capacitors for any desired or prescribed capacitances.

STARTING

Figure 6:
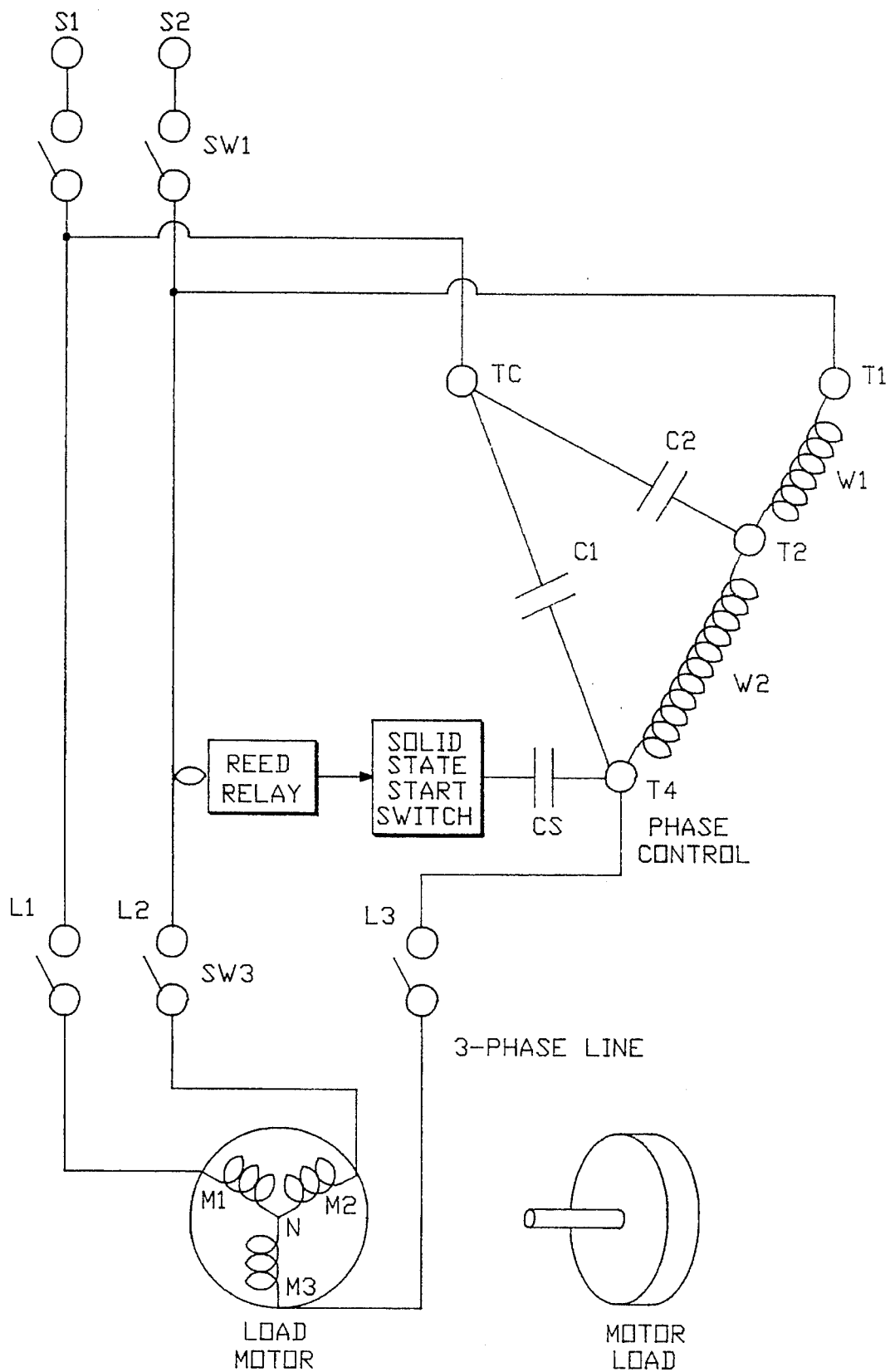
FIG. 6 is the motor of FIG. 5 with an auxiliary starting capacitor.

FIG. 6 is the motor of FIG. 5 with an auxiliary starting capacitor CS. The current in line L2 goes through a coil around a reed-relay so that the reed-relay contacts close when the current exceeds several times full load current, and the contacts open when the current is less than twice full load current. The coil is selected so that the contacts open when the motor shaft speed is greater than 80% of rated speed. The reed-relay contacts control a solid-state-switch which inserts the starting capacitor CS between terminals TC and T4. The CS is an inexpensive a-c electrolytic capacitor of intermittent duty rating. When switch SW3 is closed, and then switch SW1 is closed, the capacitor current in CS accelerates the load motor shaft from standstill up to 80% speed. During acceleration, the current in CS diminishes. At a preselected value, the relay contacts open,-and starting capacitor CS is disconnected. The motor continues to accelerate and to run on the currents delivered by C1 and C2. A reed-relay device similar to this is sold by the Franklin Electric Company, Inc., 400 East Spring Street, Bluffton, Ind. 46714, Model No. 152138901.

I have provided a 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, means to connect a capacitor between a second terminal of said transformer and said first supply line, means to connect a third terminal of said transformer to a third terminal of said motor, means to sense the current flowing in one of the Said windings of said motor, and means responsive to the sensed current to connect a second capacitor between said first supply line and said third terminal of said motor.

DUAL MODE CONTROL

Figure 7:
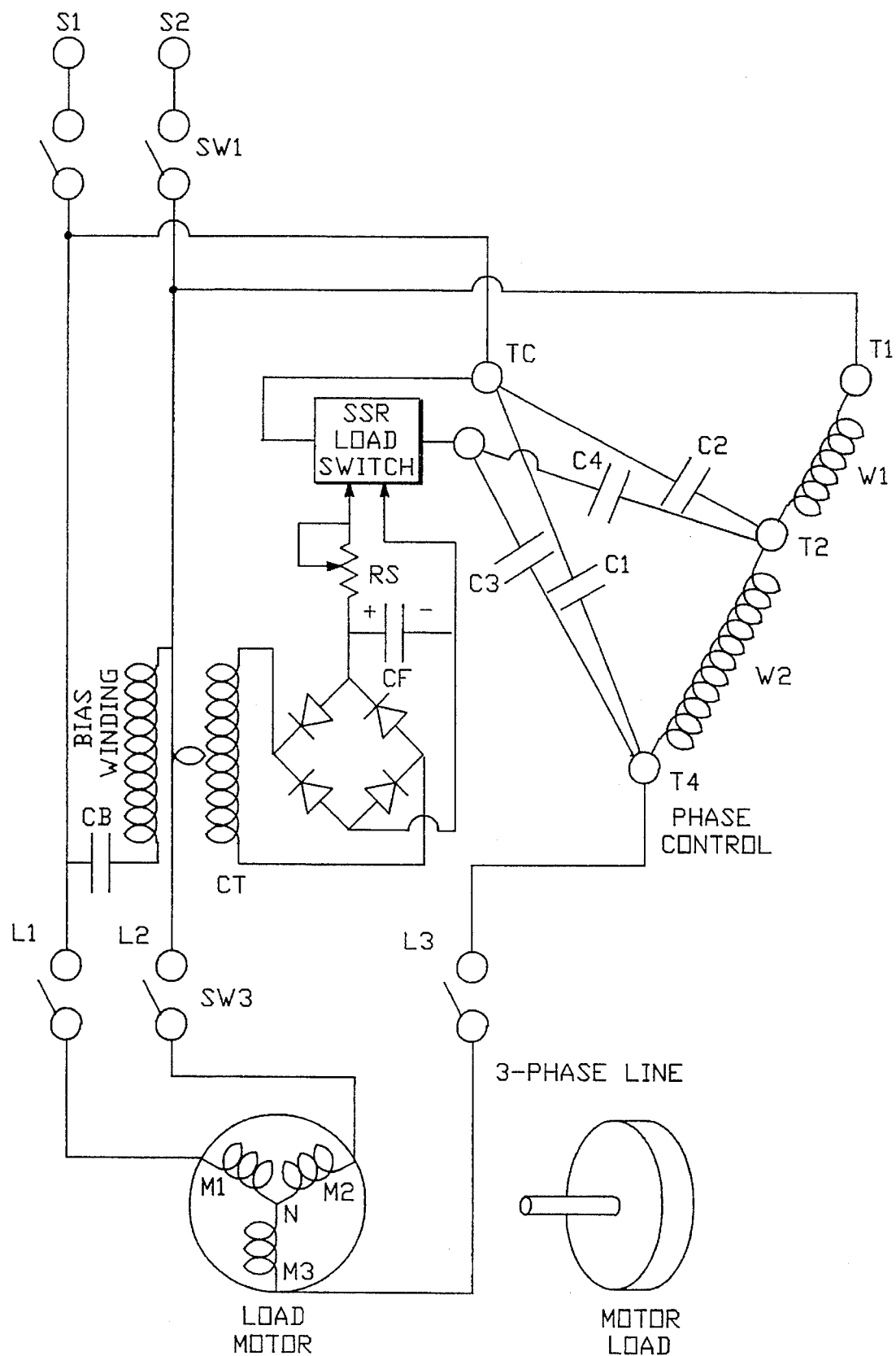
FIG. 7 is the motor of FIG. 5 with a second set of running capacitors.

FIG. 7 is the motor of FIG. 5 with a second set of running capacitors. Capacitors C1 and C2 are permanently connected as in FIG. 5. Their values, however, are chosen for low motor losses and high efficiency at light loads. For example, they could be chosen for balanced motor winding currents at half load. I call this operating region Mode L.

Additional capacitors C3 and C4 are provided. C3 has one contact on T4 and the other contact on an SSR (solid state relay) LOAD SWITCH terminal. C4 has one contact on T2 and the other contact on the same said SSR LOAD SWITCH terminal. When the SSR LOAD SWITCH is closed, the said terminal is electrically connected to TC. In this state, capacitors C1 and C3 are in parallel, and capacitors C2 and C4 are in parallel. These parallel combinations are chosen so that the motor has balanced currents at a preselected power, for example, 115% of rated power. I call this operating region Mode H.

The motor winding M2-N I call the "line winding" LW. The a-c current in this winding flows from S2 through the primary winding of a current transformer CT to L2. Then it flows through switch SW3 to M2. The a-c secondary current in the high-turn secondary of the current transformer CT flows through a bridge rectifier. The d-c output of the bridge rectifier is connected in parallel to a filter capacitor CF. The d-c output current of the bridge rectifier also flows through an adjustable resistor RS and the control input to the SSR Load Switch. Commercially available zero-crossing SSR Load Switches will open and close their a-c power contacts in the input range of one to three volts d-c.

The magnitude of the current into LW varies monotonically with the shaft load. The CT turns ratio and RS are adjusted so that the SSR a-c power contacts close for increasing power above 60%, and the SSR a-c power contacts open for decreasing power below 40%. When the SSR a-c power contacts are closed, the system is operating in Mode H. When the SSR a-c power contacts are open, the system is operating in Mode L.

The motor winding current lags the winding voltage by the power-factor angle. For different loads, this lag angle could be as large as 80 degrees, or as small as 30 degrees. But it is always lagging. As the shaft power changes, the percent lag angle change is large; but the percent current magnitude change is small.

A bias winding and bias capacitor CB is provided in FIG. 7. The bias winding has as many turns as the CT secondary. The full voltage V of the power supply between L1 and L2 is also across the capacitor CB. The bias current through CB leads the voltage V by 90 degrees. The bias current advances the phase of the CT secondary current. The bias winding polarity and the capacitor CB are selected to carry a bias current such that the current in the CT secondary winding is approximately proportional to the in-phase component of the LW winding current at light load. Between light load and full load, the phase angle of the CT secondary current will advance further, and the magnitude will be only slightly greater than the magnitude due to the in-phase power component. The CT secondary current magnitude in each mode will be approximately proportional to the shaft load, with the current characteristic being higher in the H mode than in the L mode. When the SSR switches from the L mode into the H mode, due to increasing shaft power, the additional capacitive vars increases the magnitude of the CT secondary current, and the CT secondary current increases discontinuously. This "locks" the SSR into the new H mode, and prevents cycling or dither. This is a positive feedback and produces a desirable hysteresis band of power.

When the SSR switches from the H mode into the L mode, due to decreasing load, the CT secondary current decreases discontinuously. Again, this "locks" the SSR into the new L mode. The hysteresis band of power can be adjusted by the selection of the microfarads of CB.

I have provided a 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, means to connect a third terminal of said transformer to a third terminal of said motor, means sense the current flowing in one of the said windings of said motor, means responsive to the sensed current to connect a first capacitor between said first supply line and said third terminal of said motor, and means responsive to the sensed current to connect a second capacitor between said first supply line and a second terminal of said transformer.

SEMIHEX MOTOR

Figure 8:
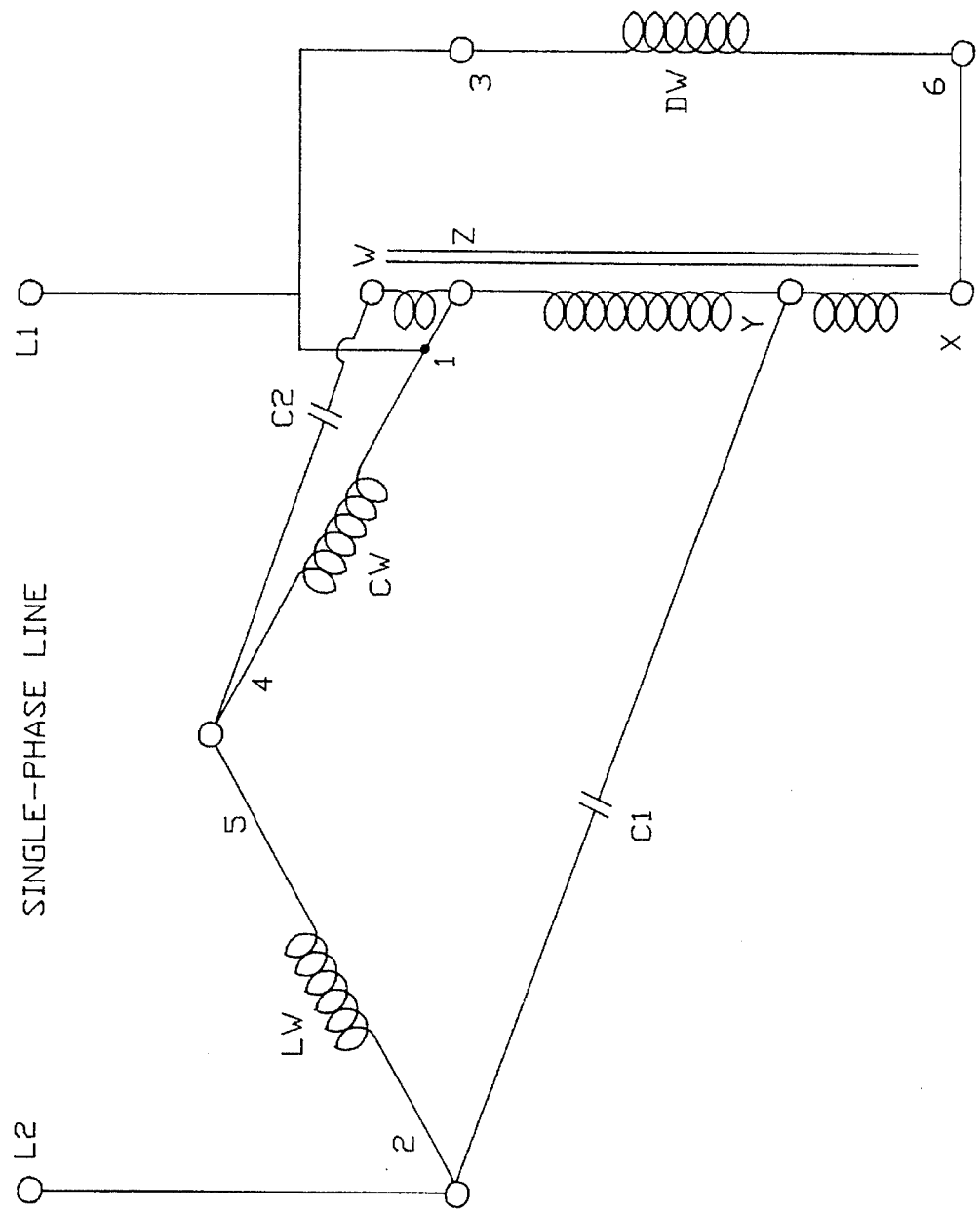
FIG. 8 is a semihex connection of the three windings of an induction motor with a transformer to excite one winding.

FIG. 8 is a semihex connection of the three windings of an induction motor with a transformer to excite one winding. The semihex connection of the three windings of a symmetrical induction motor was described in the U. S. Pat. No. 5,300,870, titled "THREE-PHASE MOTOR CONTROL" issued Apr. 5, 1994, to Otto J. M. Smith. FIGS. 1, 2B, and 4A in that patent described the winding connections and the capacitor connections. (Briefly the DW winding originally in a standard WYE connection had the terminal 6 connected to terminals 4 and 5).

My FIG. 8 uses the winding connections of this referenced patent, but not the capacitor connections. In my FIG. 8, L1 of the single-phase line is connected to machine terminals 1 and 3. L2 of the single-phase line is connected to machine terminal 2. Machine terminals 4 and 5 are connected together. An autotransformer is provided with terminals X, Y, Z, and W in sequence through the winding. The number of turns in winding X-Y is double the number of turns in winding Z-W. The design in FIG. 8 is for the largest motors with the highest power factors. The main winding Y-Z has 9/4 times the number of turns in winding X-Y. For this design, the turns ratios of 2::4::9 are for windings ZW::XY::YZ.

Machine terminal 6 is connected to terminal X. Machine terminal 3 is connected to terminal Z. Capacitor C1 is connected between terminal 2 and terminal Y. Capacitor C2 is connected between terminal 4 and terminal W.

At the balance power at which the currents in the three windings are approximately equal, and the voltages across the three windings are approximately equal, the voltage across each winding is 57.7% of the line voltage V. This is the voltage from X to Z across the transformer. The voltage from Y to Z is 9/13 times this, or 39.97% of V. The voltage from X to Y is 4/13 times 57.7%, or 17.76% of V. The voltage across the capacitor C1 is the hypotenuse of the triangle with sides of 1.00 and 0.3997. VC1 equals 1,077 V.

PHASOR DIAGRAM

Figure 9:
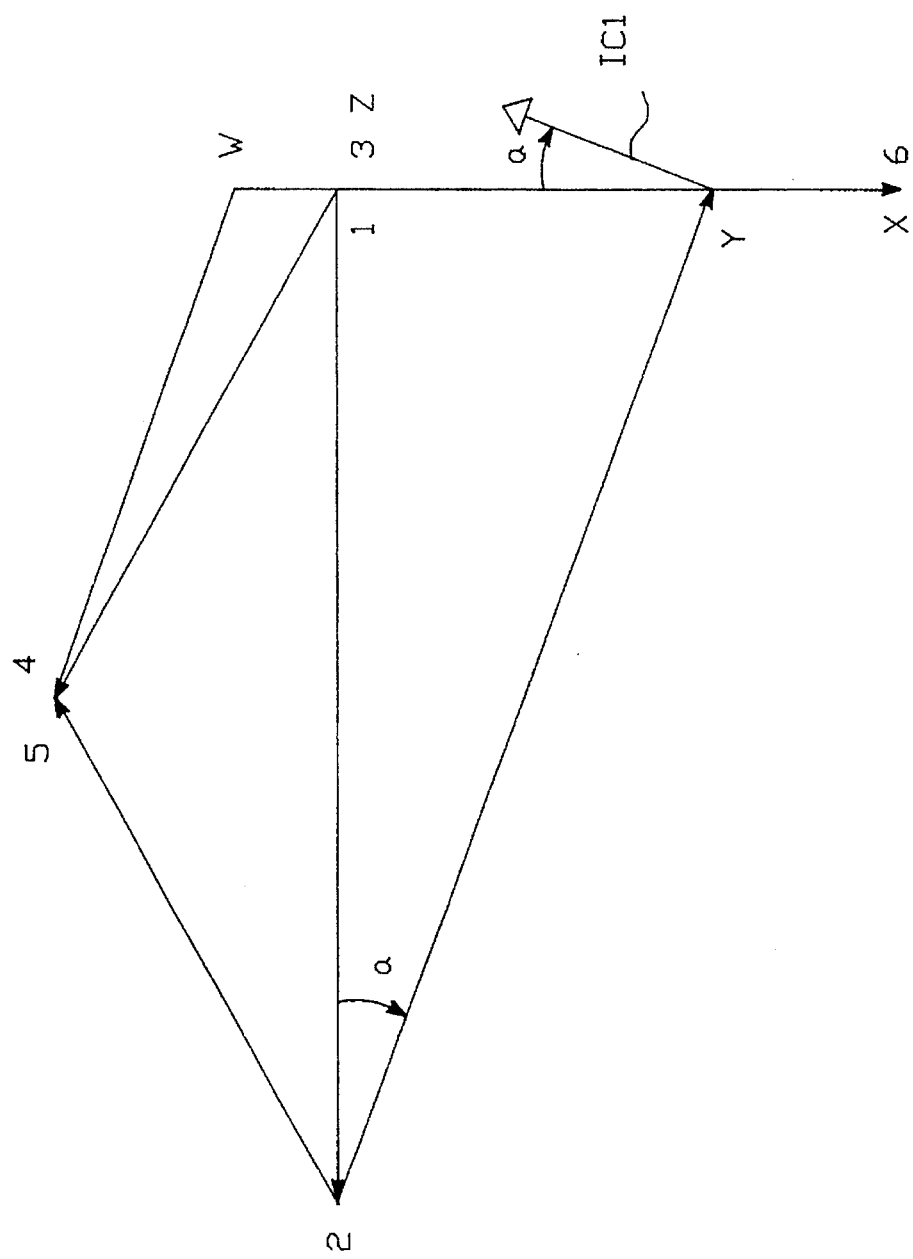
FIG. 9 is the voltage phasor diagram for FIG. 8 at balance.

FIG. 9 is the voltage phasor diagram for FIG. 8 at the balance power. The voltage 2-Y lags the supply voltage 2-1 by the angle a, which is $\tan^{-1}(0.3997)$. This is a =21.79 degrees. The current IC1 through the capacitor C1 leads the voltage 2-Y by 90 degrees. This capacitor current lags the phasor of voltage from Y to Z by a degrees also.

The current $I_{YX}$ from Y to X in the transformer is most of the current IC1 through the capacitor C1. The current $I_{YZ}$ from Y to Z in the transformer is only a part of the current IC1 through the capacitor C1.

$$I_{YX}+I_{YZ}=IC1. \tag{21}$$

The current $I_{YX}$ goes to terminal 6, and is injected into the DW winding at 6. In this winding, the power-factor is cos (a). For this particular design, the motor phase angle φ and the circuit phase angle a are both equal to 21.79 degrees.

With the turns ratios which have been chosen above, this design is suitable for a motor whose full load power-factor is $$PF=\cos(21.79)=0.9286 \tag{22}$$

In FIG. 9, the voltage W-Z is one-half of the voltage Y-X. The voltage phasor 4-1 is one half of the voltage phasor 2-X, and is parallel to it. The voltage phasor 4-W is one-half of the voltage phasor 2-Y, and is parallel to it. Because of similar triangles, the current IC2 through the capacitor C2 has the opposite phase to the current IC1. The injected current into terminal 4 is equal in magnitude to the injected current into terminal 6, which is the nameplate rated full-load or balance current I.

$$IC2=I_{W4}=-I_{YX}=-I \tag{23}$$

This is the condition for balanced currents in all of the windings. In terms of the three-phase full-load winding current I at angle φ, the transformer windings carry I in W-Z, and I in Y-X. The sum of all of the transformer ampere-turns must be zero.

$$9I_{YZ} - 4I_{YX} + 2I_{ZW} = 0 \quad (24)$$

$$9I_{YZ} - 4I - 2I = 0 \quad (25)$$

$$I_{YZ} = (2/3)I \quad (26)$$

$$I_{C1} = (5/3)I = 1.667I \quad (27)$$

The per-unit volt-amperes in the transformer windings are 0.1776, 0.6662, and 0.0888 for windings XY, YZ, and ZW respectively.

FIG. 8 is the circuit to operate a 93% power-factor motor from single-phase, balanced, using the semihex connection of the windings.

The perunit magnetizing lagging reactive vars of the three windings is 0.6429 var. From equations (23) and (27), the capacitive vars of the two capacitors is 2.3339 per unit. The net single-phase line vars is 1.691 per unit leading. The line power is 1.6083 per unit watts. The single-phase va is 2.3336 per unit and the single-phase line current is 2.3341 per unit at a power-factor of 0.68918, which leads the voltage by 46.435 degrees.

I have provided a 3-winding induction motor, a single-phase supply with two supply lines, and a transformer, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a capacitor connected between a third transformer terminal and said first motor terminal, means to connect a first supply line to said first motor terminal, and means to connect a second supply line to said third motor terminal.

I have provided a 3-winding induction motor, a single-phase supply with two supply lines, and a transformer, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a capacitor connected between a third transformer terminal and said second motor terminal, means to connect a first supply line to said first motor terminal, and means to connect a second supply line to said third motor terminal.

ADJUSTABLE POWER-FACTOR CIRCUIT

Figure 10:
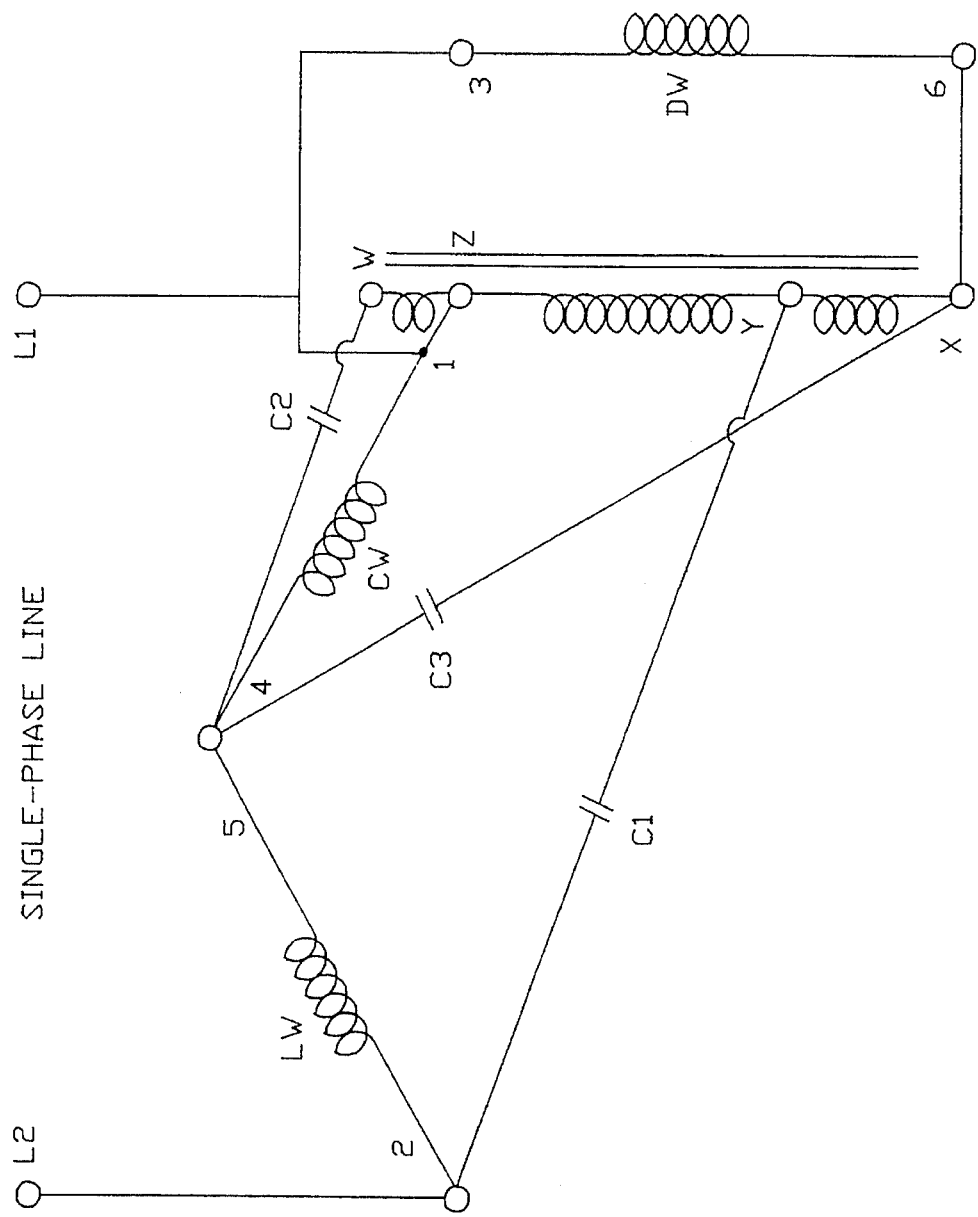
FIG. 10 is the motor of FIG. 8 with an additional capacitor C3 between terminals 4 and 6.

FIG. 10 is for a motor with a power-factor between 93% and 50%, but primarily for a power-factor between 93% and 87%. A third capacitor C3 has been added to the circuit in FIG. 8 between terminals 4 and 6 for FIG. 10. Capacitor C3 carries a current IC3 which is injected into terminal 6. The IC3 current component in winding DW lags the voltage drop across DW by 60 degrees. This current component is designated I60. The current component into (6) from the transformer is designated $I_1$. The sum of the two current components is set equal to the desired full-load winding current I at lagging phase angle $\phi$.

$$I60 = I \sin(\phi - a)/\sin(60 - a) \quad (28)$$

$$I_a = I \sin(60 - \phi)/\sin(60 - a) \quad (29)$$

$$C3 = (I60)/(377 \text{ V}) \quad (30)$$

$$C1 = 5I_a/(3*377*1.077 \text{ V}) \quad (31)$$

$$C2 = I_a/(377*0.5385 \text{ V}) \quad (32)$$

This design is useful for large, high-speed (2-pole) motors.

I have provided a 3-winding induction motor, a single-phase supply with two supply lines, and a transformer, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a first capacitor connected between a third transformer terminal and said first motor terminal, a second capacitor connected between a fourth transformer terminal and said second motor terminal, means to connect a first supply line to said first motor terminal, and means to connect a second supply line to said third motor terminal.

I have provided a 3-winding induction motor, a single-phase supply with two supply lines, and a transformer, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a first capacitor connected between a third transformer terminal and said first motor terminal, a second capacitor connected between a fourth transformer terminal and said second motor terminal, a third capacitor connected between said second motor terminal and said fourth motor terminal, means to connect a first supply line to said first motor terminal, and means to connect a second supply line to said third motor terminal.

ROTARY PHASE CONVERTER

A rotary phase converter is a three-winding machine operated with single-phase excitation across two terminals. The third terminal has a voltage induced in it which can be used as a "manufactured" third phase.

Figure 11:
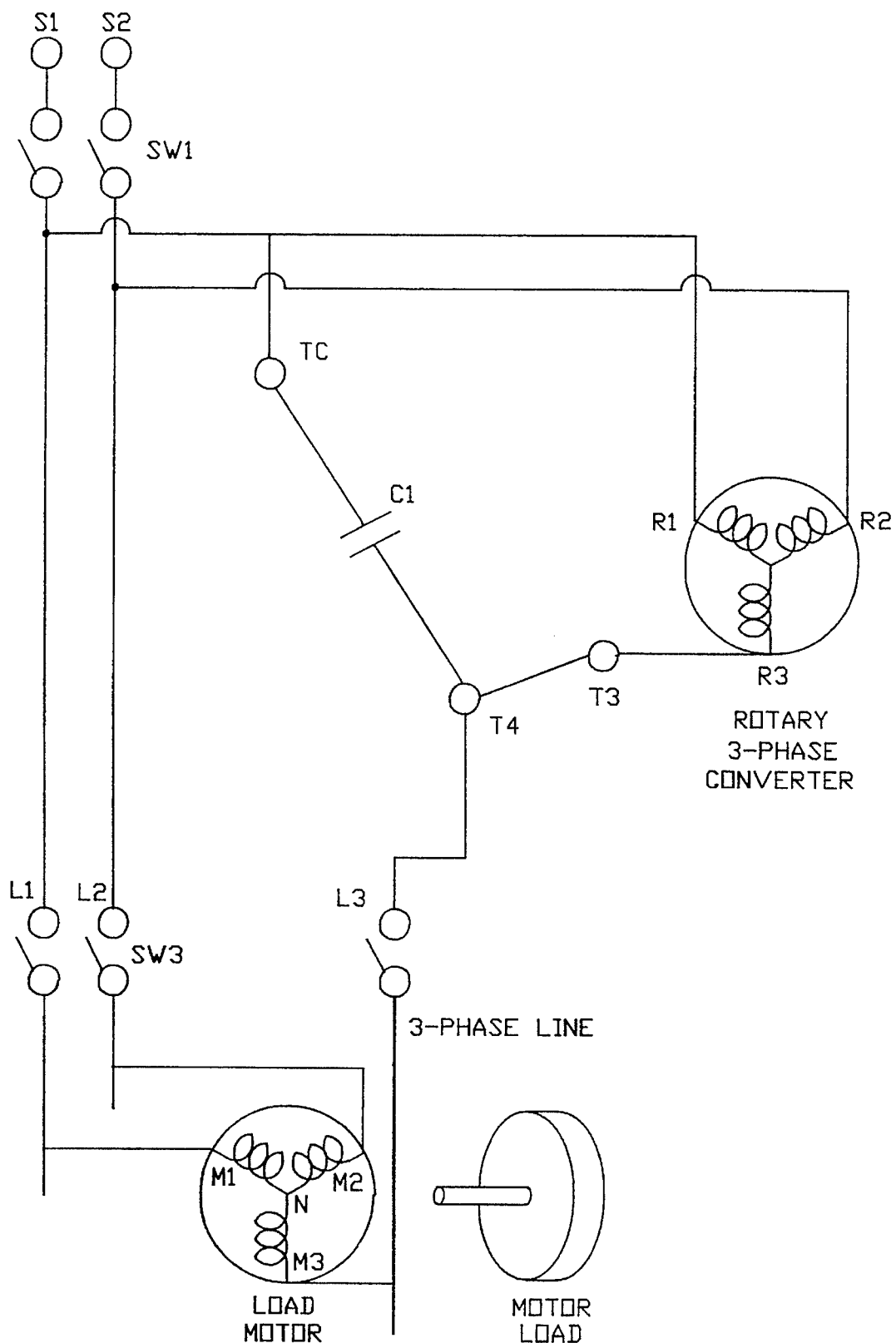
FIG. 11 is a rotary phase converter supplying a 3-winding motor.

FIG. 11 is the circuit for a PRIOR ART rotary phase converter similar to that called Roto-Phase and sold by Arco Electric Products, 2325 East Michigan Road, Shelbyville, Ind. 46176. The rotary 3-phase converter has terminals R1 and R2 which are connected directly to the single-phase power supply lines S1 and S2 by the switch SW1. A series circuit has terminal S1 connected to terminal TC, then through capacitor C1 to terminal T4, then to Terminal T3 and to Terminal R3 of the third winding of the rotary 3-phase converter.

When switch SW3 is open, and switch SW1 is closed, the converter runs like an unloaded single-phase motor. C1 provides starting torque, and could be called a starting capacitor. C1 also is a motor-run capacitor, connected permanently, and providing a current into R3, R1, R2, and R3 are connected to the lines L1, L2, and L3, which are the "manufactured" three-phase supply. When switch SW3 is closed, one of the load motors with terminals M1, M2, and M3 will be energized and will start and run.

The advantage of this converter is that several different load motors can each be run together or separately by connecting them to the 3-phase lines L1, L2, and L3.

The capacitor C1 carries a current which is injected into R3, and when SW3 is closed, part of the capacitor current is also injected into M3. The phase angle of these current components lags the winding voltages by approximately 60 degrees. For large motors, this phase angle lag is too great. It would be better if it were near 30 degrees.

Terminals TC, T3, and T4 are specifically designated, because they are part of a generic general-purpose phase-control circuit to be described below.

Figure 12:
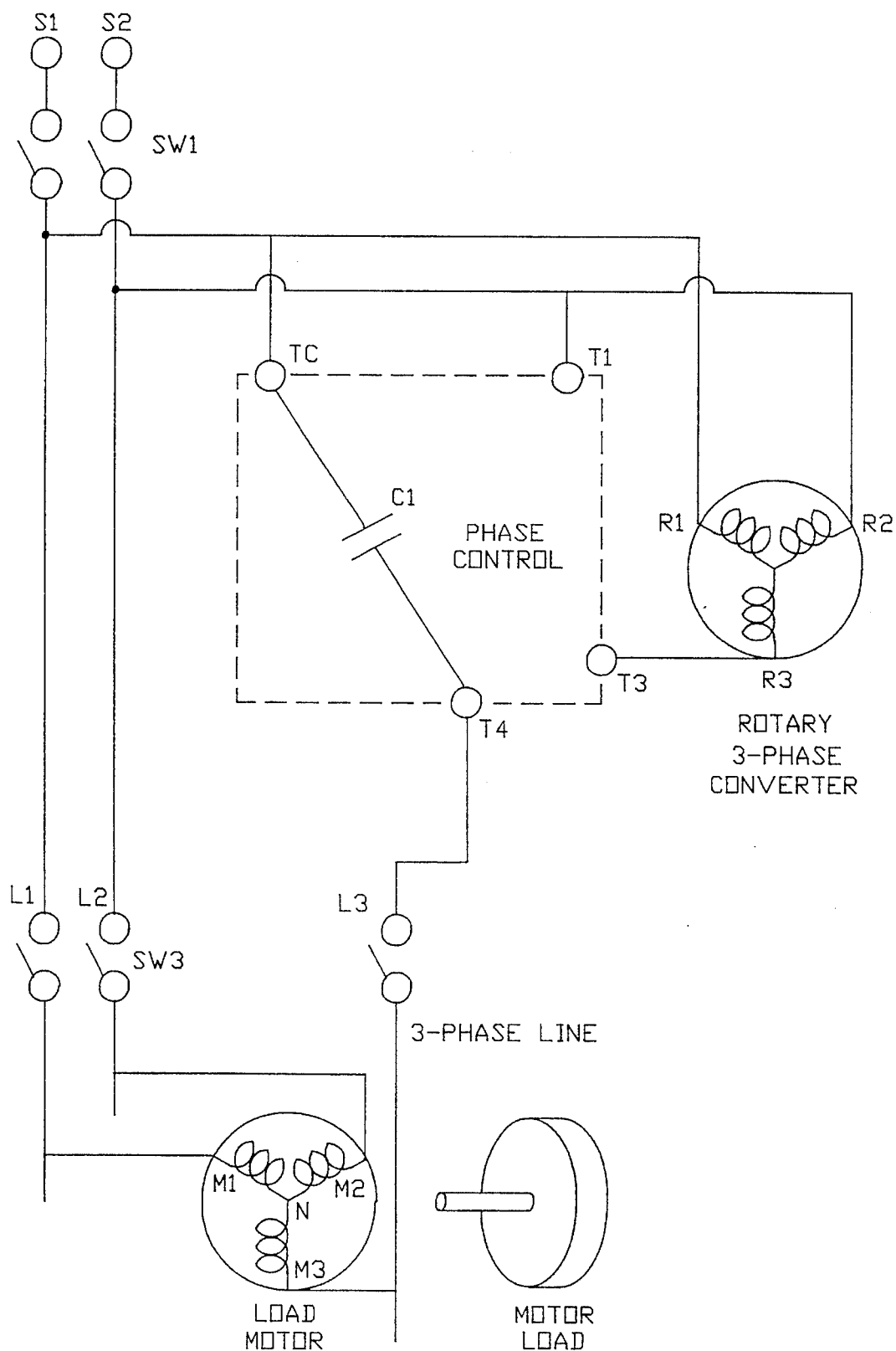
FIG. 12 is the rotary phase converter of FIG. 11 with a generic phase control box into which different control circuits may be placed.

FIG. 12 is similar to FIG. 11, with the addition of a designated PHASE CONTROL box, with a new terminal T1 connected to Lines S2 and L2 and to converter terminal R2. Terminal TC of the phase control box is connected to R1 as before. Terminal T4 of the phase control box is connected to L3 as before. In FIG. 12, there could be inserted a variety of circuits between terminals TC, T1, T3, and T4. The capacitor C1 can be omitted or changed. These different circuits are different embodiments of this invention.

The prior art in FIG. 11 can be derived from the general phase control box in FIG. 12 by inserting in the latter a conducting link between T3 and T4.

Figure 13:
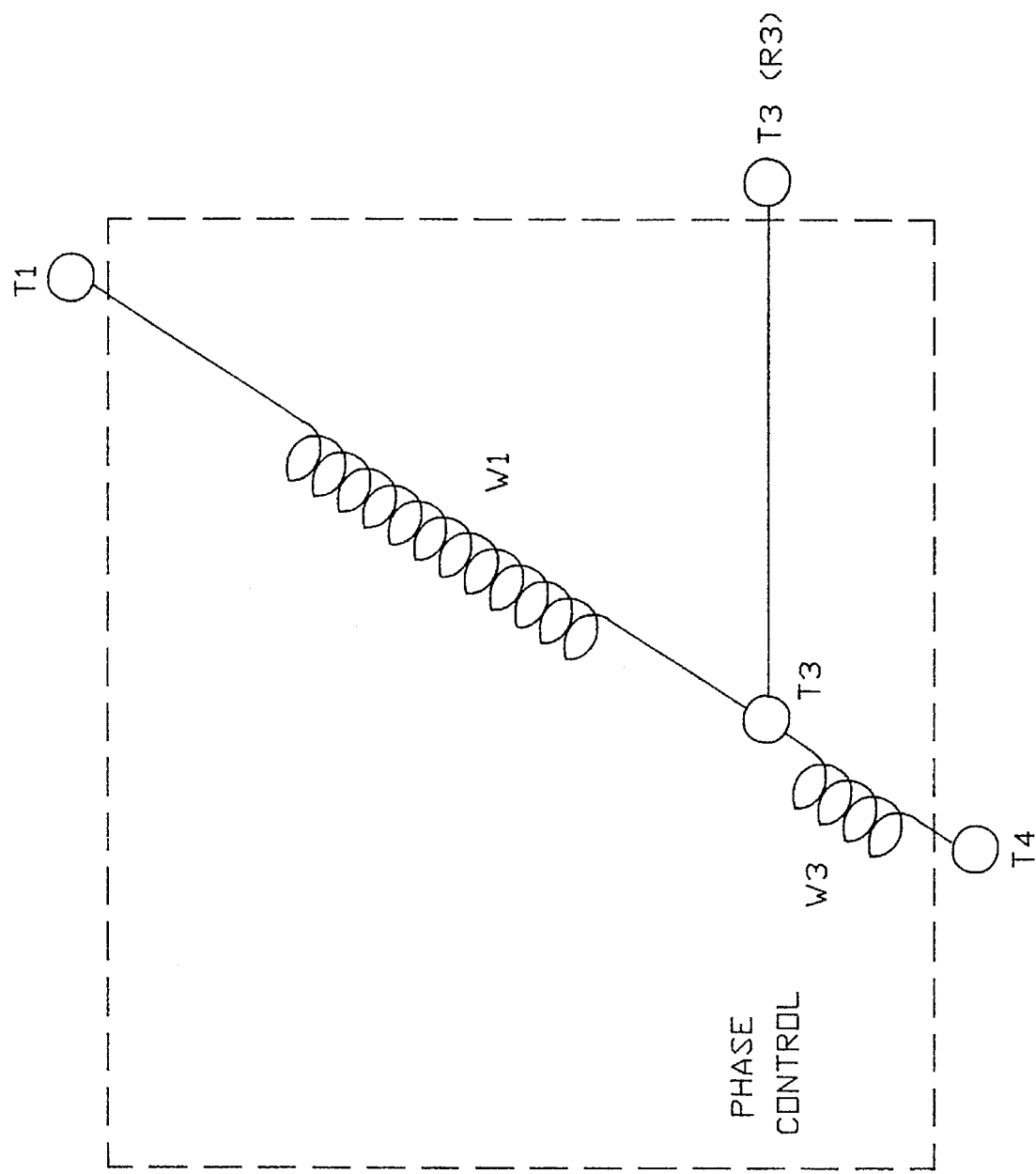
FIG. 13 is a phase-control circuit for FIG. 12, using only a voltage-boost autotransformer.

FIG. 13 is a unique new phase control box for use in FIG. 12. Capacitor C1 is omitted. There is not a direct link between T3 and T4. Instead, there is a tapped autotransformer connected between T1 and T4, with the tap connected to T3 and therefore to R3. The voltage generated between R2 and R3 of the converter is impressed across the T1-T-3 winding W1 of the transformer. A secondary transformer voltage appears across winding W3 between T3 and T4, so that the voltage from T1 to T4 is higher than the voltage generated in the converter. This is a voltage-boost autotransformer. It compensates for the fact that the converter voltage at T3 is usually low, and because of internal winding impedance, with substantial loads, it is undesirably low. This voltage-boost transformer in FIG. 13 can be chosen to provide rated full voltage with the maximum full load of the load motor or load motors in FIG. 12. 25% or 30% voltage boost is a reasonable amount. FIG. 13 does not have the capacitor C1.

I have provided a rotatable 3-phase machine, a 2-wire single-phase power supply, a 3-terminal 3-phase voltage source, a transformer, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, and a third terminal of said transformer connected to a third terminal of said source.

Figure 14:
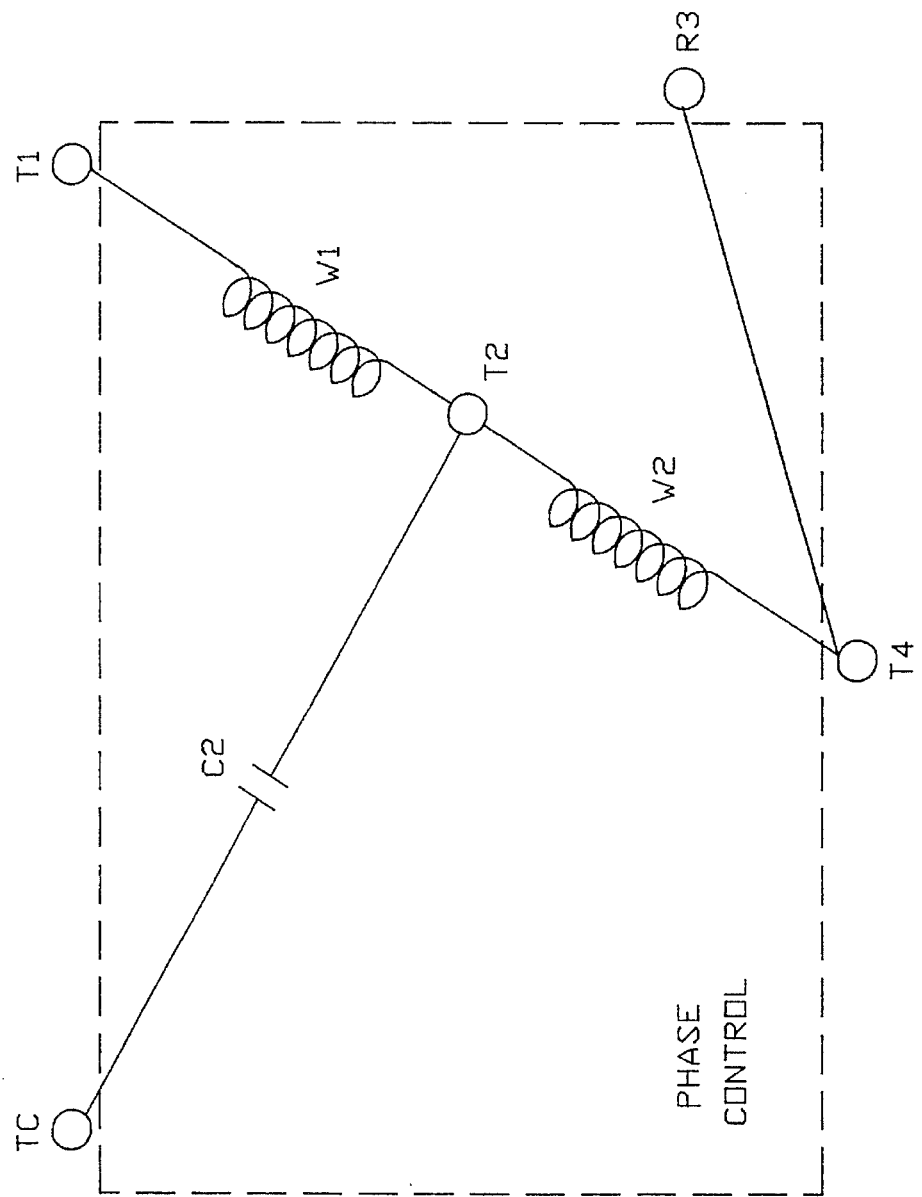
FIG. 14 is another phase-control circuit for FIG. 12, using a capacitor and a tapped autotransformer.

FIG. 14 is another embodiment of this invention, in which a center-tapped autotransformer is connected between T1 and T4. A capacitor C2 is connected between the center tap T2 and the terminal TC. A conducting link is connected between T4 and R3. In FIG. 14, the transformer supply voltage is the voltage between Ti(R2) and T4(R3). The voltage across the capacitor C2 lags the supply voltage by approximately 30 degrees. This is similar to FIG. 1 and FIG. 3.

Similarly, the current through C2 drives the winding whose terminal is R3 with a current which lags the winding voltage by approximately 30 degrees. This is suitable for a large converter, and for large load motors.

I have provided a rotatable 3-phase machine, a 2-wire single-phase power supply, a 3-terminal 3-phase voltage source, a transformer, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine and to a third terminal of said source, and means to connect a capacitor between said first wire and a third terminal of said transformer.

Figure 15:
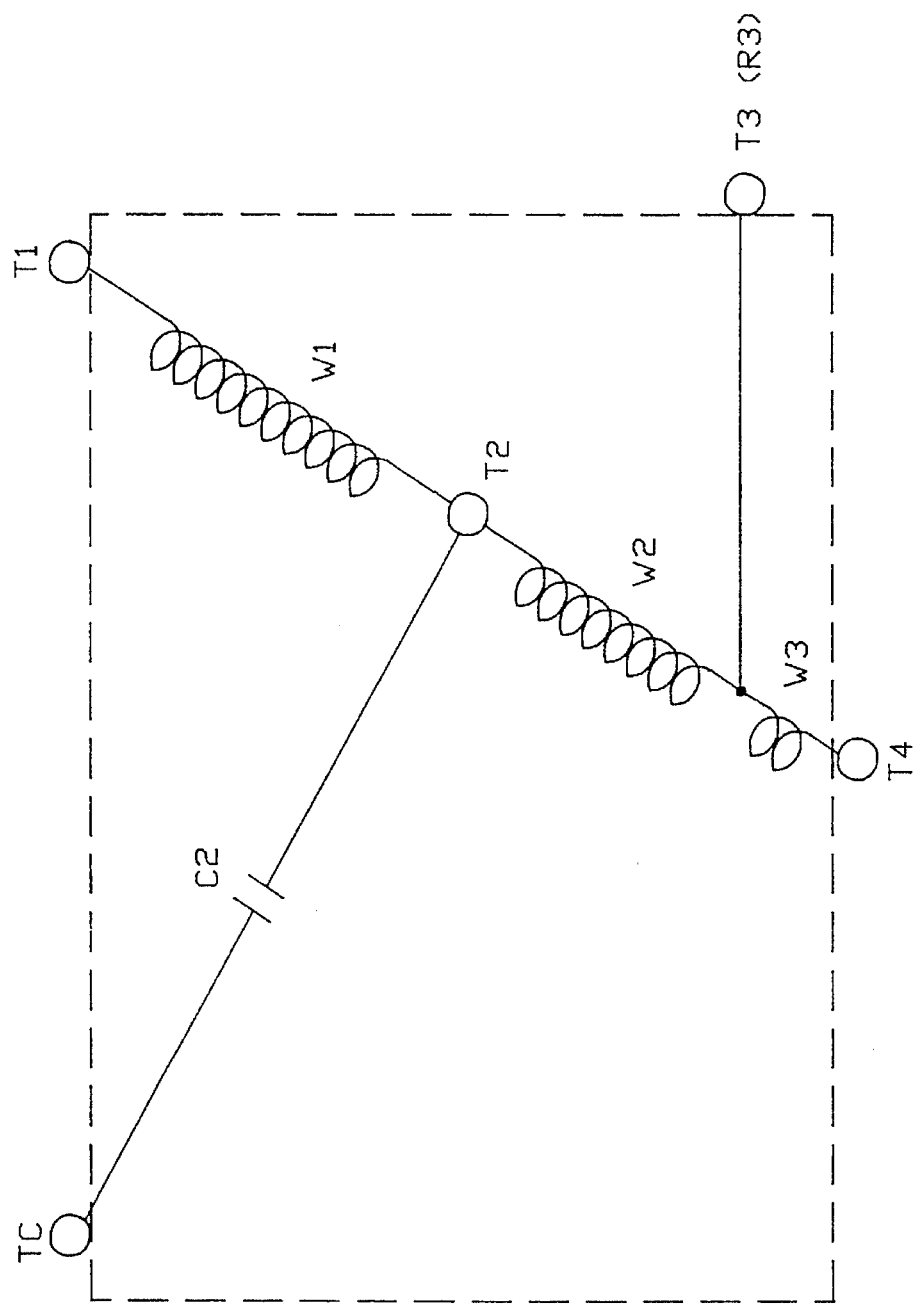
FIG. 15 is another phase-control circuit for FIG. 12, using both a capacitor and a tapped voltage-boost autotransformer.
Figure 16:
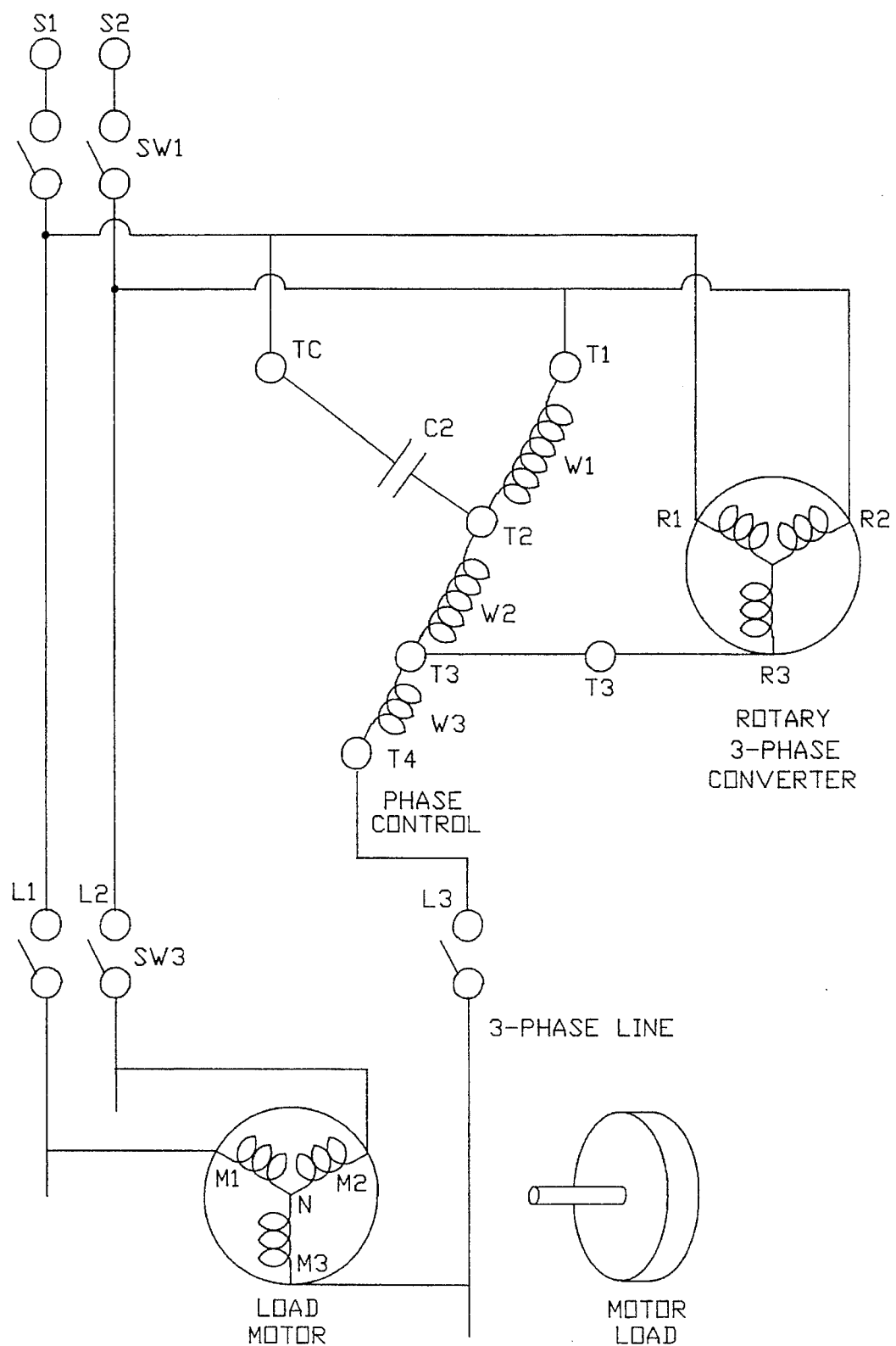
FIG. 16 is a rotary phase converter supplying a 3-winding motor from a single-phase supply, with the phase control circuit of FIG. 15.

The contributions of FIG. 13 and FIG. 14 are combined in FIG. 15 and 16. The full voltage between R2 and R3 of the converter is connected to the full-voltage winding of the autotransformer between T1 and T3 respectively. Terminal T2 is near a center-tap on the autotransformer. C2 is connected between T2 and TC. The voltage boost winding W3 is connected between T3 and T4. Line L3 and the load motor terminal M3 are connected to T4.

The magnitude of C2 is chosen to deliver the desired injected current into the third phase at full load. The location of the tap T2 is chosen to specify the phase angle of this injected current. A center-tap will make the phase lag angle near 30 degrees. When W1 has fewer turns than W2, the phase lag angle can be less than 30 degrees. When W2 has fewer turns than W1, the phase lag angle can be set to any preselected angle between 30 and 60 degrees.

The voltage boost in winding W3 can compensate for winding reactance drops. It can be large enough to make the voltage T4-to-T1 equal to rated voltage with the largest motor loads.

Figure 24:
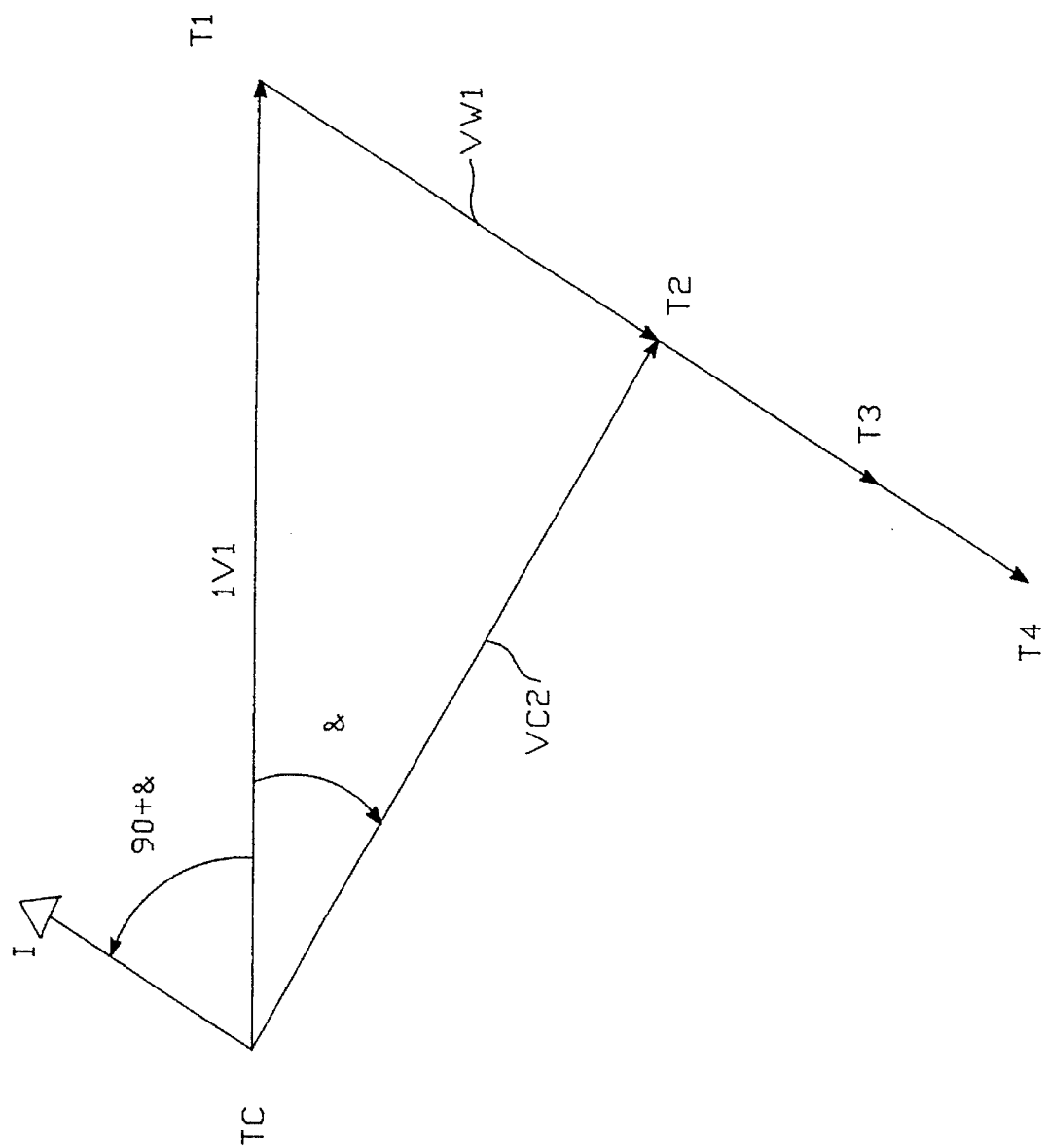
FIG. 24 is the voltage phasor diagram for FIGS. 15 and 16.
Figure 6:
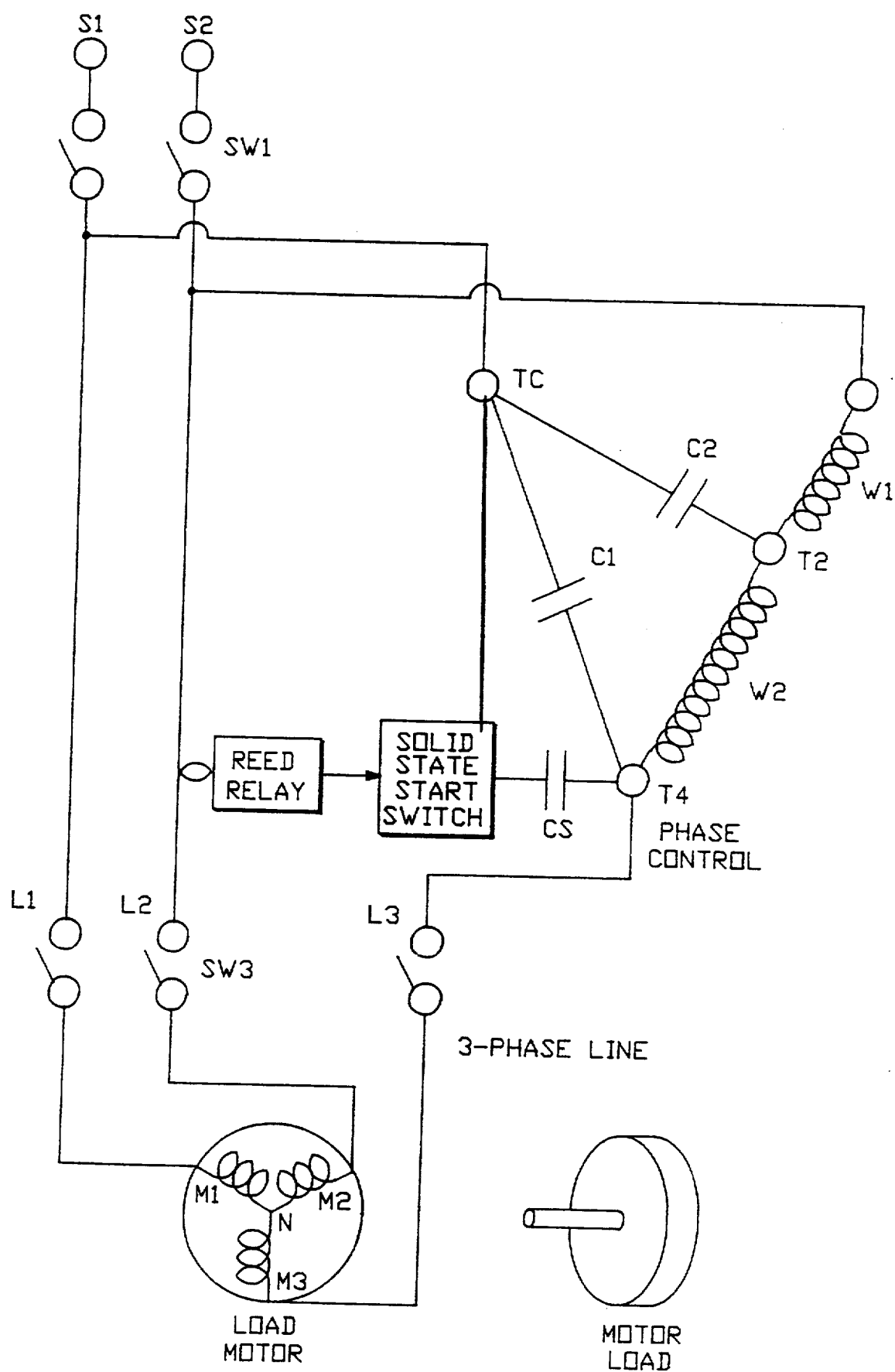

FIG. 24 is the voltage phasor diagram for FIGS. 15 and 16. The voltage from TC to T1 is the applied voltage of magnitude |V| and reference angle zero. The voltage from T1 to T2, called VW1, lags the reference by 120 degrees, and depending upon the location of the tap for T2, could be more or less than V/2 in magnitude. The voltage from T2 to T3 also lags the reference by 120 degrees and is approximately equal to (V-VW1) in magnitude. It could be more than this amount for light loads, and less than this amount for heavy loads. The voltage from T3 to T4 also lags the reference by 120 degrees and is much less than V in magnitude. Typically it might be V/4. The voltage from TC to T2 is the voltage VC2 across the capacitor C2, which in this phasor diagram equals 0.87 V,m and lags the reference by an angle "&" of approximately −30 degrees. The phasor marked I is the current through the capacitor C2, which leads the voltage by 90 degrees, so that the current phase angle is (90+&) degrees. The current from T2 to T1 in winding W1 would have this same phase angle if there were only two windings on the transformer core. The current from T2 to T3 in winding W2 also would have this same phase angle if there were only two windings on the transformer core. There is a load current to the load motor from T3 to T4, whose ampere turns in W3 will modify the currents in the other windings.

I have provided a rotatable 3-phase machine, a 2-wire single-phase power supply, a 3-terminal 3-phase voltage source, a transformer, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, a third terminal of said transformer connected to a third terminal of said source, and means to connect a capacitor between a fourth terminal of said transformer and said first wire.

OPTIMUM PHASE CONTROL FOR ROTARY CONVERTER

FIG. 16 shows the phase control circuit of FIG. 15 complete with the converter R1, R2, and R3, and the three-phase line L1, L2, and L3, and one of the load motors, M1, M2, and M3.

In prior-art phase converters, the phase converter rotary machine had to be significantly larger than the largest load motor, and the "manufactured" voltage on L3 was often much less than rated voltage. In my improved phase converter of FIG. 16, the rotary converter machine can be smaller than the largest load motor, and the voltage on L3 can be set equal to the rated voltage with the maximum power on all of the load motors.

Figure 17:
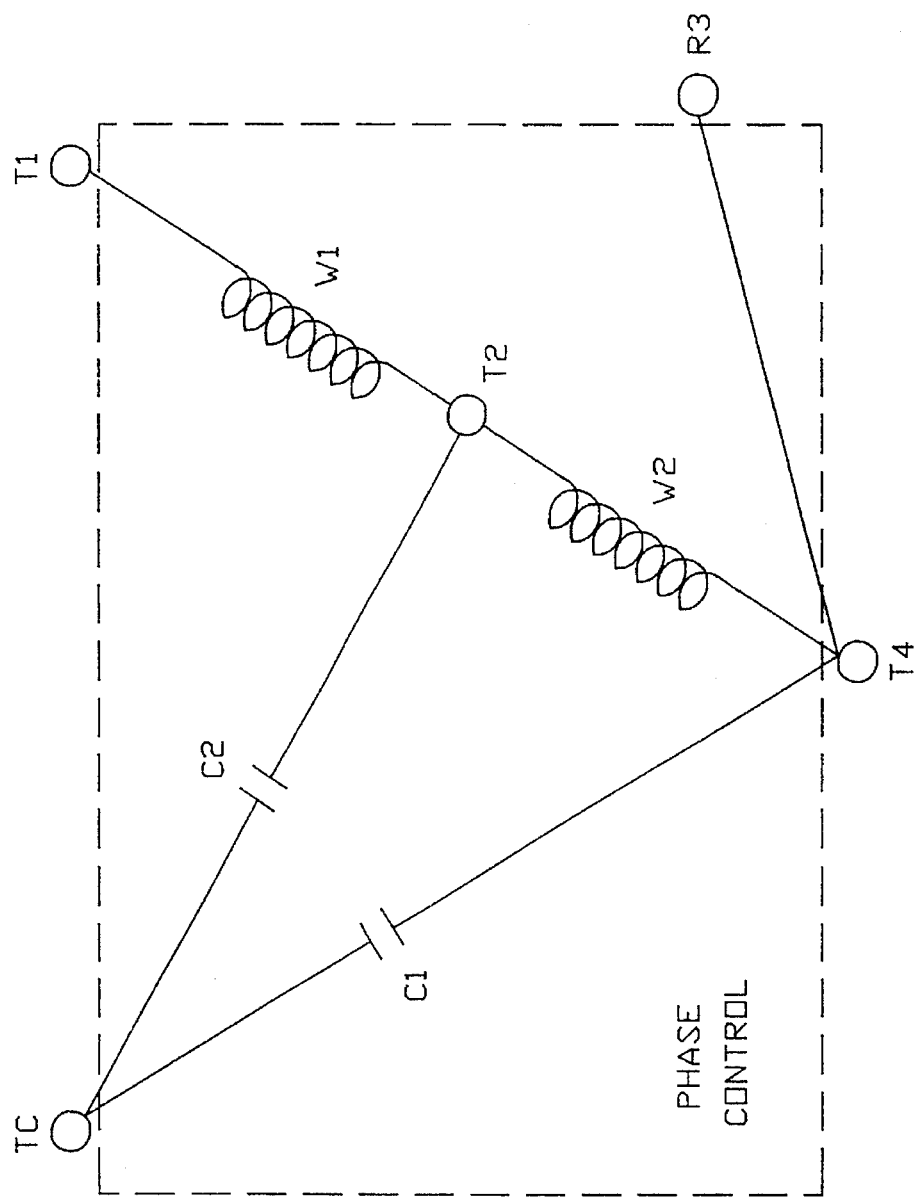
FIG. 17 is an augmented 2-capacitor phase control circuit using both the capacitor C1 of FIG. 12 and the capacitor C2 with the tapped autotransformer of FIG. 14.

FIG. 17 is an augmented 2-capacitor phase control circuit using both the capacitor C1 of FIG. 12 and the capacitor C2 with the tapped autotransformer of FIG. 14.

Capacitor C1 can provide a 60-degree current into R3. Capacitor C2 can provide a 30-degree or 25-degree current into R3. For a large phase converter, with a small lagging phase angle $\phi$, C2 is large, C1 is small, and the transformer supplies most of the injected excitation current into R3. The purpose of C1 is to adjust the phase angle $\phi$ to a preselected desired angle.

For a small phase converter, with a large lagging phase angle $\phi$, C1 is large, C2 is small, and the transformer power rating is small. The purpose of C2 is to advance and adjust the phase angle $\phi$ to a preselected desired angle less than 60 degrees.

Figure 18:
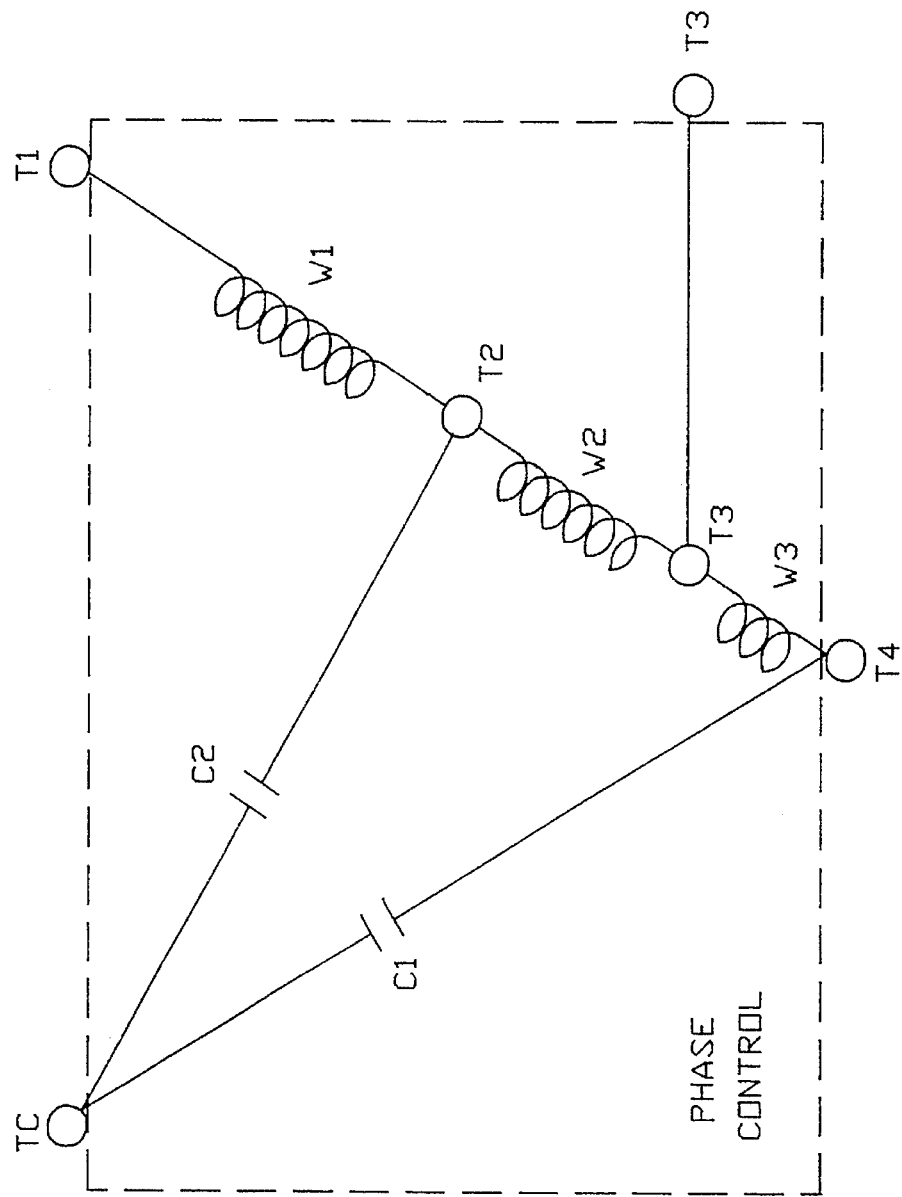

FIG. 18 is an augmented 2-capacitor phase control circuit using both the capacitor C1 of FIG. 12 and the capacitor C2 with the voltage-boost autotransformer of FIG. 13. FIG. 18 is like FIG. 17 with the addition of the voltage-boost winding W3 in the transformer, and the connection of R3 to T3, so that the voltage at T4 is greater than the voltage at R3. FIG. 18 is the lowest cost control, and has the highest flexibility in design.

Figure 19:
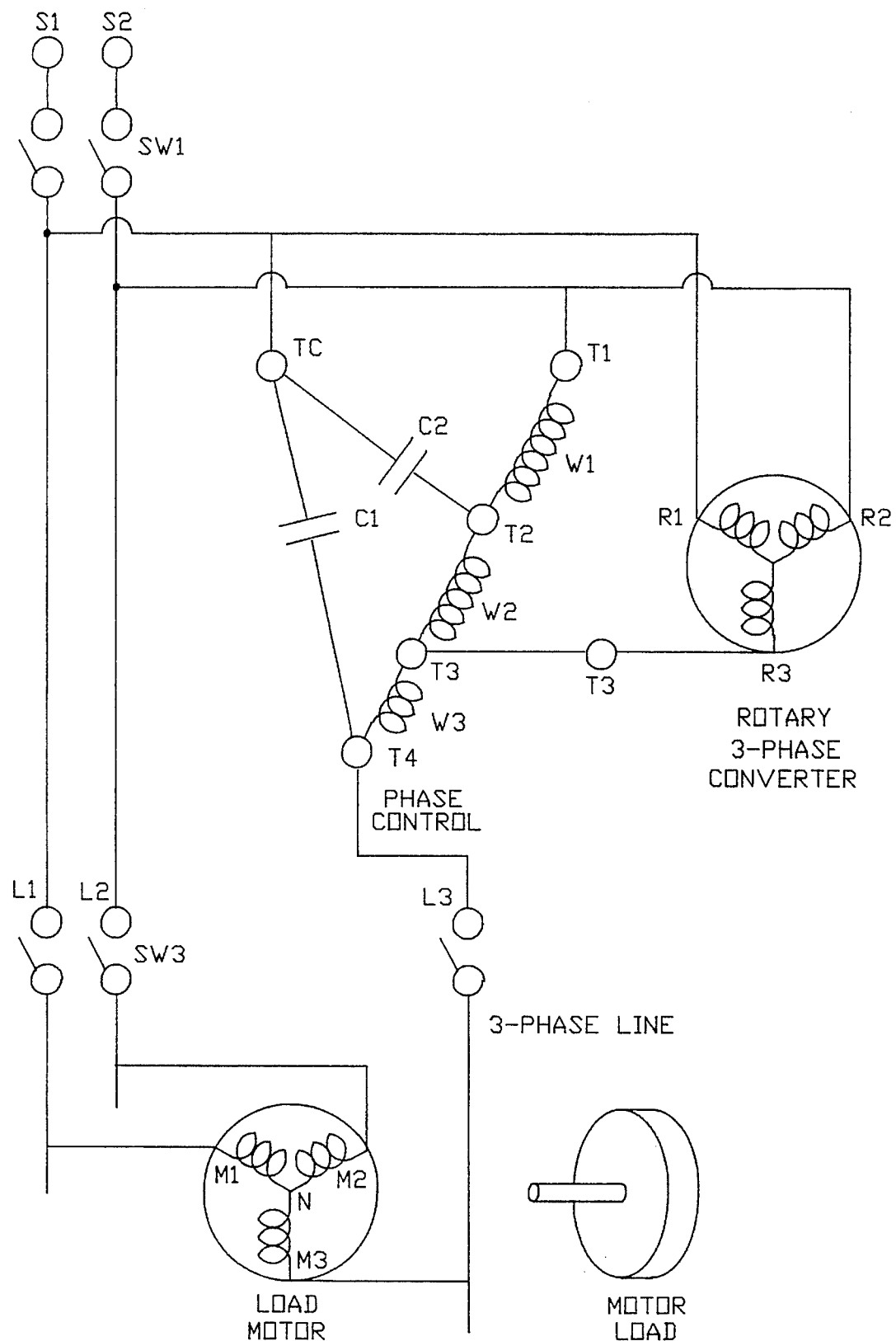
FIG. 19 is a two-capacitor rotary phase converter supplying a 3-winding motor from a single-phase supply, with the phase control circuit of FIG. 18.

FIG. 19 is the complete rotary phase converter system, using the phase control of FIG. 18. With two capacitors, the injected current into R3 and L3 can be adjusted to any lagging phase angle $\phi$ between 60 degrees and 20 degrees. The magnitude of the injected current can also be preselected by selecting the magnitudes of C1 and C2. The voltage between T4 and T1, which is the voltage between L3 and L2, can be adjusted by the design of the voltage added by the winding W3.

The rotary converter machine can be a symmetrically-wound three-winding machine of conventional construction.

This design invention results in a low cost for the rotary converter machine, a low cost for the autotransformer, a low cost for the capacitors, and a desirable high voltage on line L3 and the motor terminals connected to this line.

Figure 20:
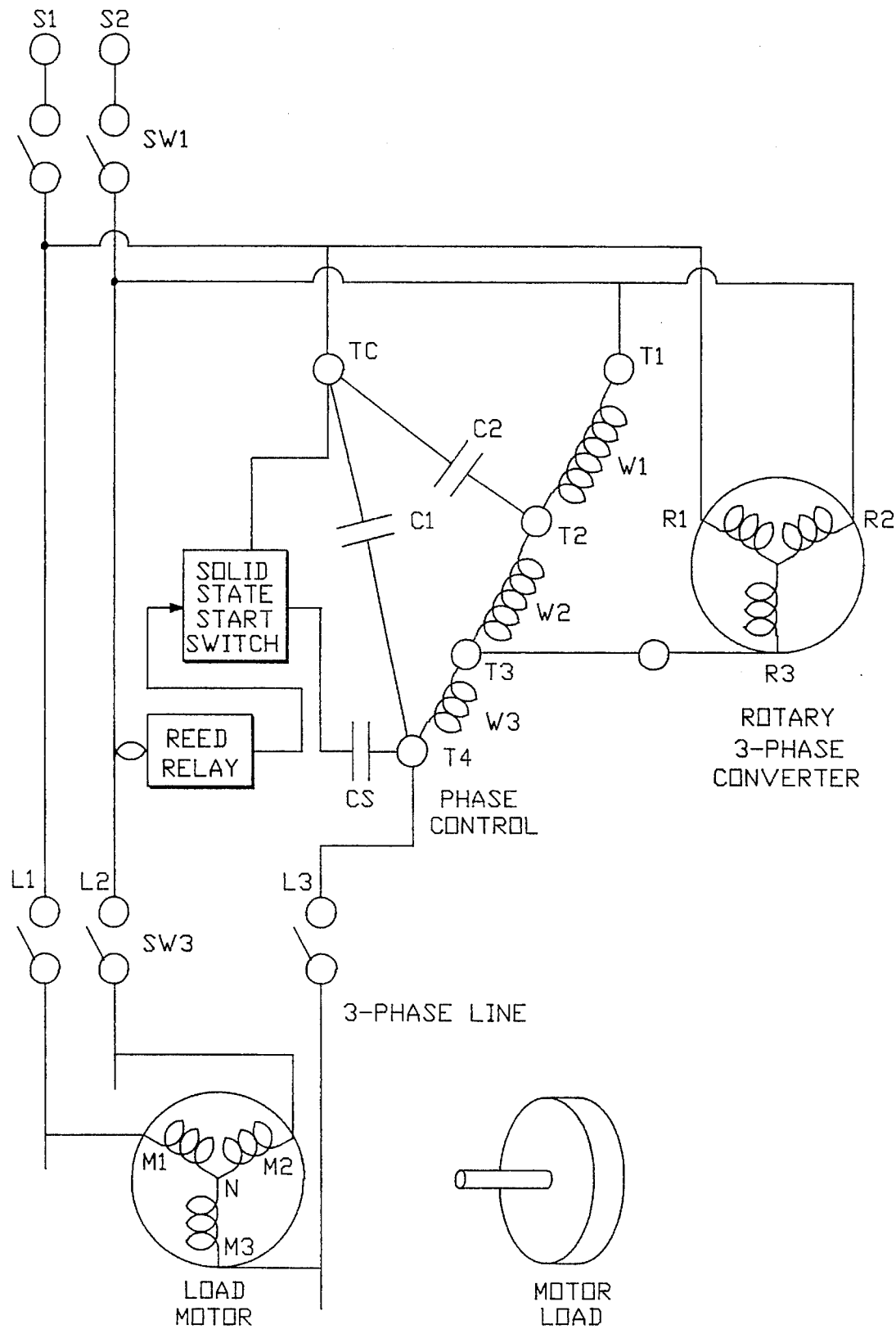
FIG. 20 is the rotary phase converter of FIG. 19, with the addition of a starting capacitor.

FIG. 20 is the rotary phase converter system of FIG. 19, with the addition of an auxiliary starting capacitor CS. The rotary converter machine is started with the capacitors C1 and C2 only, when switch SW1 is closed, since the machine has no shaft load, and starts easily. Switch SW3 must then be closed to connect a load motor. For small load motors, the reed-relay does not respond. Only for the largest load motor will the reed-relay respond. The current in line L2 goes through a coil around the reed-relay so that the reed-relay contacts close when the current exceeds several times full load current, and the contacts open when the current is less than twice full load current. The coil is selected so that the contacts open when the motor shaft speed is greater than 80% of rated speed. The reed-relay contacts control a solid-state-switch which inserts the starting capacitor CS between terminals TC and T4. The CS is an inexpensive a-c electrolytic capacitor of intermittent duty rating. When switch SW3 is closed on the largest load motor, the capacitor current in CS accelerates the load motor shaft from standstill up to 80% speed. During acceleration, the current in CS diminishes. At a preselected value, the relay contacts open, and starting capacitor CS is disconnected. The motor continues to accelerate and to run on the currents delivered by C1 and C2. A reed-relay device similar to this is disclosed in FIG. 6.

Figure 21:
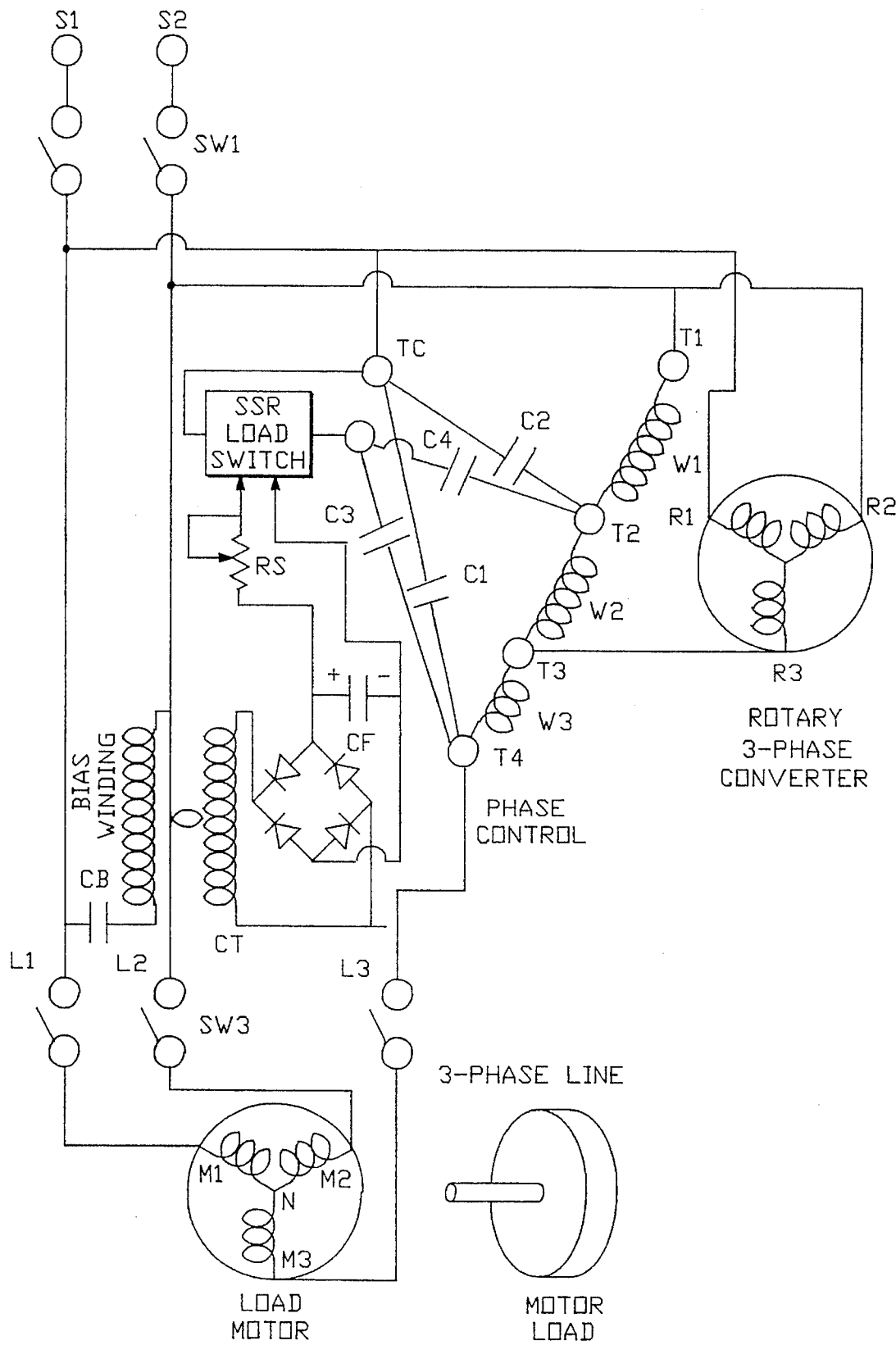
FIG. 21 is the rotary phase converter of FIG. 19, with a second set of running capacitors.

FIG. 21 is the rotary converter system of FIG. 19, with the addition of a second set of motor-run capacitors. The controls in FIG. 21 are similar to those in FIG. 7. Capacitors C1 and C2 are permanently connected as in FIG. 19. Their values, however, are chosen for small load motors. For example, they could be chosen for balanced motor winding currents at half of all of the loads on the converter. I call this operating region Mode Half.

Additional capacitors C3 and C4 are provided in FIG. 21. C3 has one contact on T4 and the other contact on an SSR LOAD SWITCH terminal. C4 has one contact on T2 and the other contact on the same said SSR LOAD SWITCH terminal. When the SSR LOAD SWITCH is closed, the said terminal is electrically connected to TC. In this state, capacitors C1 and C3 are in parallel, and capacitors C2 and C4 are in parallel. These parallel combinations are chosen so that the motor has balanced currents at a preselected power, for example, 115% of rated power. I call this operating region Mode H.

The motor winding M2-N I call the "line winding" LW. The a-c current in this winding flows from S2 through the primary winding of a current transformer CT to L2. Then it flows through switch SW3 to M2. The a-c secondary current in the high-turn secondary of the current transformer CT flows through a bridge rectifier. The d-c output of the bridge rectifier is connected in parallel to a filter capacitor CF. The d-c output current of the bridge rectifier also flows through an adjustable resistor RS and the control input to the SSR Load Switch. Commercially available zero-crossing SSR Load Switches will open and close their a-c power contacts in the input range of one to three volts d-c.

The magnitude of the current into L2 and M2 varies monotonically with the loads on the load motors. The CT turns ratio and RS are adjusted so that the SSR a-c power contacts close for increasing power above 70% of maximum load, and the SSR a-c power contacts open for decreasing power below 50%. When the SSR a-c power contacts are closed, the system is operating in Mode Full. When the SSR a-c power contacts are open, the system is operating in Mode Half.

The motor winding currents lag the winding voltage by a composite power-factor angle. For different loads, this lag angle could be as large as 80 degrees, or as small as 30 degrees. But it is always lagging. As the shaft powers change, the percent lag angle change is large; but the percent current magnitude change is small.

A bias winding and bias capacitor CB is provided in FIG. 21. The bias winding has as many turns as the CT secondary. The full voltage V of the power supply between S1 and S2 is also across the capacitor CB. The bias current through CB leads the voltage V by 90 degrees. The bias current advances the phase of the CT secondary current. The bias winding polarity and the capacitor CB are selected to carry a bias current such that the current in the CT secondary winding is approximately proportional to the in-phase component of the L2 line current at the lightest loads. Between light load and full load, the phase angle of the CT secondary current will advance further, and the magnitude will be only slightly greater than the magnitude due to the in-phase power component. The CT secondary current magnitude in each mode will be approximately proportional to the sum of the motor powers, with the current characteristic being higher in the Full mode than in the Half mode. When the SSR switches from the Half mode into the Full mode, due to increasing motor powers, the additional capacitive vars added to L3 increases the magnitude of the CT secondary current, and the CT secondary current increases discontinuously. This "locks" the SSR into the new Full mode, and prevents cycling or dither. This is a positive feedback and produces a desirable hysteresis band of power.

When the SSR switches from the Full mode into the Half mode, due to decreasing motor powers, the CT secondary current decreases discontinuously. Again, this "locks" the SSR into the new Half mode. The hysteresis band of powers that can be in either mode can be adjusted by the selection of the microfarads of CB.

This improved rotary-phase-converter system in FIG. 21 is superior to presently available converters in that this design invention results in a lower cost for the rotary converter machine, a low cost for the autotransformer, a low cost for the capacitors, and a desirable high voltage on line L3 and the motor terminals connected to this line.

I have provided a rotatable 3-phase machine, a 2-wire single-phase power supply, a 3-terminal 3-phase voltage source, a transformer, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, a third terminal of said transformer connected to a third terminal of said source, means to connect said 3-terminal source to a 3-phase motor, including means to sense the current flowing from one terminal of said source to one terminal of said three-phase motor, and means responsive to said sensed current to connect a first capacitor between a fourth terminal of said transformer and said first wire.

I have provided a rotatable 3-phase machine, a 2-wire single-phase power supply, a 3-terminal 3-phase voltage source, a transformer, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, a third terminal of said transformer connected to a third terminal of said source, means to connect said 3-terminal source to a 3-phase motor, including means to sense the current flowing from one terminal of said source to one terminal of said three-phase motor, means responsive to said sensed current to connect a first capacitor between a fourth terminal of said transformer and said first wire, and means to connect a second capacitor between said third terminal of said transformer and said first wire.

What is claimed is:

1. A 3-Winding induction motor with three electrical terminals, a single phase power supply with two lines, and a transformer with at least three electrical terminals, a first motor terminal connected to a first supply line, a second motor terminal connected to a second supply line, a first terminal of said transformer also connected to said second supply line, means to connect a capacitor between a second terminal of said transformer which is intermediate said first and third terminals, and said first supply line, and means to connect a third terminal of said transformer to a third terminal of said motor.

2. A 3-winding induction motor with three electrical terminals, a single-phase power supply with two lines, and an autotransformer with three electrical terminals, a first motor terminal connected to a first supply line, a second motor terminal connected to a second supply line, a first terminal of said autotransformer also connected to said second supply line, means to connect a capacitor between a second intermediate terminal of said autotransformer and said first supply line, and means to connect a third terminal of said autotransformer to a third terminal of said motor.

3. A motor as in claim 1, wherein said transformer is a three-terminal autotransformer.

4. A motor as in claim 1, and means to connect a second capacitor between said first supply line and said third terminal of said motor.

5. A motor as in claim 1, including means to sense the current flowing in one of the said windings of said motor, and means responsive to the sensed current to connect a second capacitor between said first supply line and said third terminal of said motor.

6. A motor as in claim 1, including means to sense the current flowing in one of the said windings of said motor, and means responsive to the sensed current to connect a second capacitor between said first supply line and said second terminal of said transformer.

7. A motor as in claim 1, including means to sense the current flowing in one of the said windings of said motor, means responsive to the sensed current to connect a second capacitor between said first supply line and said third terminal of said motor, and means responsive to the sensed current to connect a third capacitor between said first supply line and said second terminal of said transformer.

8. A 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, means to sense the current flowing in one of the said windings of said motor, means responsive to the sensed current to connect a first capacitor between said first supply line and said third terminal of said motor, means responsive to the sensed current to connect a second capacitor between said first supply line and said second terminal of said transformer, and means to connect a third terminal of said transformer to a third terminal of said motor.

9. A 3-winding induction motor, a single-phase supply with two supply lines, and a transformer with at least three electrical terminals, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a first capacitor connected between a third transformer terminal and said first motor terminal, means to connect a first supply line to said first motor terminal, and means to connect a second supply-line to said third motor terminal.

10. A 3-winding induction motor as in claim 9, including means for connecting a second capacitor between a fourth transformer terminal and said second motor terminal.

11. A 3-winding induction motor as in claim 9, including a second capacitor connected between a fourth transformer terminal and said second motor terminal, and means for connecting a third capacitor between said second motor terminal and said fourth motor terminal.

12. A rotatable 3-phase machine, a 2-wire single-phase power supply, a 3-terminal 3-phase voltage source, a transformer with at least three electrical terminals, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, and a third terminal of said transformer connected to a third terminal of said source.

13. A rotatable 3-phase machine, a 2-wire single-phase power supply, a 3-terminal 3-phase voltage source, a transformer with at least three electrical terminals, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine and to a third terminal of said source, and means to connect a capacitor between a third terminal of said transformer and said first wire.

14. A rotatable 3-phase machine, a 2-wire single-phase power supply, a 3-terminal 3-phase voltage source, a transformer with at least three electrical terminals, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, a third terminal of said transformer connected to a third terminal of said source, and means to connect a capacitor between a fourth terminal of said transformer and said first wire.

15. A machine as in claim 14, including a second capacitor connected between said first wire and said third terminal of said source.

16. A machine as in claim 14, including means to connect a three-phase motor to said three-terminal source.

17. A machine as in claim 15, including means to connect a three-phase motor to said three-terminal source.

18. A rotatable 3-phase machine, a 2-wire single-phase power supply, a 3-terminal 3-phase voltage source, a transformer with at least three electrical terminals, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine, a third terminal of said transformer connected to a third terminal of said source, means to connect said 3-terminal source to a 3-phase motor, including means to sense the current flowing from one terminal of said source to one terminal of said three-phase motor, and means responsive to said sensed current to connect a capacitor between a fourth terminal of said transformer and said first wire.

19. A machine as in claim 18, including means responsive to said sensed current to connect a second capacitor between said third terminal of said transformer and said first wire.

20. A method of using a 3-winding induction motor with three electrical terminals, a single-phase power supply with two lines, and a transformer with at least three electrical terminals, a first motor terminal connected to a first supply line, a second motor terminal connected to a second supply line, a first terminal of said transformer also connected to said second supply line, a capacitor connected between a second terminal of said transformer and said first supply line, and a connection of a third terminal of said transformer to a third terminal of said motor.

21. A method of using a 3-winding induction motor, a single-phase supply with two supply lines, and a transformer with at least three electrical terminals, said motor having four terminals, a first motor winding connected between a first motor terminal and a second motor terminal, a second motor winding connected between said second motor terminal and a third motor terminal, a third motor winding connected between said third motor terminal and a fourth motor terminal, a first transformer terminal connected to said third motor terminal, a second transformer terminal connected to said fourth motor terminal, a first capacitor connected between a third transformer terminal and said first motor terminal, a first supply line connected to said first motor terminal, and a second supply line connected to said third motor terminal.

22. A method of using a rotatable 3-phase machine, a 2-wire single-phase power supply, a 3-terminal 3-phase voltage source, a transformer with at least three electrical terminals, a first wire of said supply connected to a first terminal of said machine and to a first terminal of said source, a second wire of said supply connected to a second terminal of said machine and to a second terminal of said source and to a first terminal of said transformer, a second terminal of said transformer connected to a third terminal of said machine and to a third terminal of said source, and a capacitor connected between a third terminal of said transformer and said first wire.

23. A three-winding induction motor with three terminals 120 degrees apart in phase including a single phase power supply with two lines, such lines being connected across two of the three terminals, and a transformer with at least three electrical terminals including a transformer winding, the third terminal of the induction motor being connected to or near the end of said transformer winding with the other end of the winding connected to one of the supply lines and the other supply line being connected to a capacitive reactance which effectively taps into said transformer winding at an intermediate location on the winding to provide an injected current into said third terminal of the motor, such current having a suitable phase angle for operation of the motor, such phase angle being determined by the location on the winding of said tap.

24. A three-winding electrical rotatable machine with three terminals approximately 120 degrees apart in voltage phase, a single phase power supply with two wires, a first of said wires being connected to a first of said machine terminals and the second of said wires being connected to a second of said machine terminals, a transformer with a winding with a first winding tap connected to a third of said machine terminals, a second transformer winding tap connected to one of the said two wires, and the other of the said two wires connected to one contact of a capacitor, the other contact of the said capacitor connected to a third intermediate transformer winding tap.

25. A machine as in claim 25, such that the capacitor injects into the third transformer winding tap a current having a suitable phase for operation of the machine.

26. A machine as in claim 25, including the other of the said two wires also connected to one contact of a second capacitor, the other contact of the said second capacitor connected to the third of the said machine terminals.

* * * * *

UNITED STATES PATENT AND TRADEMARK OFFICE
CERTIFICATE OF CORRECTION

PATENT NO.   :   5,545,965
DATED        :   August 13, 1996
INVENTOR(S)  :   Otto J. M. Smith It is certified that error appears in the above-indentified patent and that said Letters Patent is hereby corrected as shown below:

In Figure 6, a line should extend between terminal TC and the "SOLID STATE START SWITCH", as shown on the attached sheet.

The foregoing was in the original informal drawing.

Signed and Sealed this

Eighteenth Day of March, 1997

Attest:

BRUCE LEHMAN

*Attesting Officer*       *Commissioner of Patents and Trademarks*